(12) United States Patent
Jackson et al.

(10) Patent No.: US 10,126,740 B2
(45) Date of Patent: Nov. 13, 2018

(54) SYSTEM AND METHOD FOR VIOLATION ENFORCEMENT UTILIZING VEHICLE IMMOBILIZATION

(71) Applicant: ENDEAVORING, LLC, Palatine, IL (US)

(72) Inventors: Scott A. Jackson, Palatine, IL (US); Luke Smith, Palatine, IL (US)

(73) Assignee: ENDEAVORING, LLC, Palatine, IL (US)

( * ) Notice: Subject to any disclaimer, the term of this patent is extended or adjusted under 35 U.S.C. 154(b) by 0 days.

(21) Appl. No.: 15/225,200

(22) Filed: Aug. 1, 2016

(65) Prior Publication Data
US 2016/0342156 A1 Nov. 24, 2016

Related U.S. Application Data

(60) Division of application No. 14/213,419, filed on Mar. 14, 2014, now Pat. No. 9,406,086, which is a
(Continued)

(51) Int. Cl.
*G05D 1/00* (2006.01)
*G06Q 40/02* (2012.01)
(Continued)

(52) U.S. Cl.
CPC ......... *G05D 1/0022* (2013.01); *G06Q 40/025* (2013.01); *G06Q 50/26* (2013.01);
(Continued)

(58) Field of Classification Search
CPC .... G05D 1/0022; G06Q 40/025; G06Q 50/26; G08G 1/00; G08G 1/01; G08G 1/017;
(Continued)

(56) References Cited

U.S. PATENT DOCUMENTS 3,656,111 A * 4/1972 Royster, Sr. ........... G08G 1/017
340/425.5
5,557,254 A * 9/1996 Johnson ................ B60R 25/102
340/426.19
(Continued)

OTHER PUBLICATIONS

Office Action from U.S. Appl. No. 13/230,507 dated Feb. 3, 2014.
(Continued)

*Primary Examiner* — Angelina Shudy
(74) *Attorney, Agent, or Firm* — Klintworth & Rozenblat IP LLP

(57) ABSTRACT

A system for violation enforcement utilizing vehicle immobilization is provided. The system includes a database configured to store identifying information for a plurality of target vehicles subject to immobilization. The system includes a license plate recognition device configured identify a plurality of vehicles and a geographic locations associated with each vehicle. A data server receives the data identifying the plurality of vehicles and the plurality of geographic locations associated with each vehicle. An output processor is in operative communication with the data server and the database and is configured to process the received data and to compare the received data to the stored identifying information for the plurality of target vehicles. The output processor is further configured to generate and transmit a notification to a recovery vehicle when identifying information for one or more target vehicles matches the identifying information for one or more vehicles in the received data.

5 Claims, 10 Drawing Sheets

Related U.S. Application Data continuation-in-part of application No. 13/230,507, filed on Sep. 12, 2011, now Pat. No. 8,781,169.

(60) Provisional application No. 61/790,343, filed on Mar. 15, 2013, provisional application No. 61/409,623, filed on Nov. 3, 2010.

(51) Int. Cl.
  *G08G 1/017* (2006.01)
  *G08G 1/00* (2006.01)
  *G06Q 50/26* (2012.01)

(52) U.S. Cl.
  CPC ........... *G08G 1/0175* (2013.01); *G08G 1/205* (2013.01); *G06K 2209/15* (2013.01)

(58) Field of Classification Search
  CPC ........ G08G 1/0175; G08G 1/205; G08G 1/20; G06K 2209/15
  USPC .................................................. 701/2
  See application file for complete search history.

(56) References Cited

U.S. PATENT DOCUMENTS

| | | | |
|---|---|---|---|
| 5,917,405 A * | 6/1999 | Joao | B60R 25/018 307/10.2 |
| 6,081,206 A * | 6/2000 | Kielland | G06Q 30/0284 194/902 |
| 6,195,648 B1 * | 2/2001 | Simon | B60R 25/04 235/382 |
| 6,411,887 B1 * | 6/2002 | Martens | G08G 1/017 180/167 |
| 6,701,231 B1 * | 3/2004 | Borugian | B60R 25/04 307/10.2 |
| 7,046,169 B2 | 5/2006 | Bucholz et al. | |
| 7,103,614 B1 | 9/2006 | Kucik | |
| 7,277,869 B2 | 10/2007 | Starkman | |
| 7,323,970 B1 * | 1/2008 | Murray | B60R 25/04 340/426.11 |
| 7,397,363 B2 * | 7/2008 | Joao | B60R 25/102 340/539.11 |
| 7,538,655 B1 * | 5/2009 | King | B60R 25/04 307/10.1 |
| 7,552,004 B2 * | 6/2009 | Brikho | B60T 7/22 340/426.13 |
| 7,579,965 B2 | 8/2009 | Bucholz | |
| 7,843,321 B2 * | 11/2010 | Marchasin | G08G 1/017 340/505 |
| 7,932,836 B2 * | 4/2011 | Nguyen | B60R 25/042 340/426.11 |
| 8,487,740 B2 * | 7/2013 | Tsuruta | B60R 25/04 235/375 |
| 8,560,161 B1 | 10/2013 | Kator et al. | |
| 8,744,412 B1 * | 6/2014 | Cazanas | H04W 4/12 455/412.1 |
| 8,781,169 B2 * | 7/2014 | Jackson | G08G 1/205 382/104 |
| 8,937,559 B2 * | 1/2015 | Ioli | G06Q 20/40 235/384 |
| 8,971,582 B2 * | 3/2015 | DeHart | G08G 1/127 382/105 |
| 9,156,436 B2 * | 10/2015 | Hopper | B60R 25/09 |
| 9,183,530 B2 * | 11/2015 | Schwarz | G06Q 10/06 |
| 9,253,251 B2 * | 2/2016 | Jackson | G08G 1/0175 |
| 9,373,142 B2 * | 6/2016 | Smith | H04W 4/025 |
| 9,406,086 B2 * | 8/2016 | Jackson | G08G 1/0175 |
| 9,639,899 B1 * | 5/2017 | Gersitz | G06Q 40/12 |
| 9,734,462 B2 * | 8/2017 | Ioli | G06Q 10/00 |
| 9,858,480 B2 * | 1/2018 | Nerayoff | G06Q 20/145 |
| 9,916,761 B2 * | 3/2018 | Smith | G08G 1/127 |
| 9,939,809 B1 * | 4/2018 | Obaidi | G05D 1/0011 |
| 9,963,105 B1 * | 5/2018 | Gordon | B60R 25/09 |
| 9,978,100 B2 * | 5/2018 | Mack | G06Q 40/025 |
| 2002/0067248 A1 * | 6/2002 | Howells | B60R 25/04 340/426.12 |
| 2002/0111881 A1 * | 8/2002 | Walker | G06Q 20/20 707/737 |
| 2002/0140289 A1 * | 10/2002 | McConnell | B60R 11/02 307/10.1 |
| 2002/0186144 A1 * | 12/2002 | Meunier | F21V 5/04 340/815.45 |
| 2004/0124707 A1 * | 7/2004 | Boggs | B60R 25/04 307/10.5 |
| 2004/0145447 A1 * | 7/2004 | Yuhara | B60R 25/04 340/5.2 |
| 2004/0176978 A1 * | 9/2004 | Simon | B60R 25/2018 705/35 |
| 2004/0204795 A1 * | 10/2004 | Harvey | B60R 25/04 701/1 |
| 2004/0227616 A1 * | 11/2004 | Lafferty | G07B 15/063 340/5.61 |
| 2005/0068196 A1 * | 3/2005 | Marin | G07B 15/00 340/932.2 |
| 2005/0088320 A1 * | 4/2005 | Kovach | G07C 5/085 340/933 |
| 2005/0171660 A1 * | 8/2005 | Woolford | G06F 1/3203 701/29.3 |
| 2005/0177492 A1 | 8/2005 | Camping | |
| 2005/0179320 A1 | 8/2005 | Shimomura | |
| 2005/0195069 A1 * | 9/2005 | Dunand | B60R 25/043 340/5.61 |
| 2005/0237150 A1 * | 10/2005 | Sun | G07C 9/00182 340/5.52 |
| 2005/0240324 A1 * | 10/2005 | Boman | B60R 21/015 701/36 |
| 2005/0270178 A1 * | 12/2005 | Ioli | G06Q 20/40 340/932.2 |
| 2005/0279820 A1 | 12/2005 | Moynihan et al. | |
| 2006/0022809 A1 * | 2/2006 | Lessard | B60R 25/04 340/426.1 |
| 2006/0066148 A1 * | 3/2006 | Nguyen | B60R 25/042 307/10.2 |
| 2006/0129500 A1 * | 6/2006 | Mandy | G06Q 20/367 705/65 |
| 2006/0208924 A1 * | 9/2006 | Matalon | G07B 15/063 340/933 |
| 2006/0214783 A1 * | 9/2006 | Ratnakar | G08G 1/0175 340/505 |
| 2006/0255119 A1 * | 11/2006 | Marchasin | B60R 25/093 235/375 |
| 2007/0069921 A1 * | 3/2007 | Sefton | G08G 1/0175 340/932.2 |
| 2007/0112620 A1 * | 5/2007 | Johnson | G07B 15/00 705/13 |
| 2007/0168104 A1 | 7/2007 | Nelson et al. | |
| 2007/0185728 A1 * | 8/2007 | Schwarz | G06Q 10/06 701/36 |
| 2007/0208681 A1 * | 9/2007 | Bucholz | G08G 1/017 706/47 |
| 2008/0027602 A1 * | 1/2008 | Yeap | B60R 25/04 701/31.4 |
| 2008/0068180 A1 * | 3/2008 | Powell | G07B 15/063 340/572.8 |
| 2008/0234878 A1 * | 9/2008 | Joao | B60R 25/102 701/2 |
| 2008/0238719 A1 * | 10/2008 | Marchasin | G08G 1/017 340/901 |
| 2009/0005987 A1 | 1/2009 | Vengroff et al. | |
| 2009/0085731 A1 * | 4/2009 | Boggess | B60R 25/043 340/426.12 |
| 2009/0160604 A1 * | 6/2009 | Nguyen | B60R 25/042 340/5.2 |
| 2009/0227240 A1 * | 9/2009 | Sheets | G06F 3/03545 455/414.2 |
| 2009/0267757 A1 * | 10/2009 | Nguyen | B60R 25/042 340/539.11 |
| 2010/0070349 A1 * | 3/2010 | Daems | G01S 5/0027 705/13 |

(56) References Cited

U.S. PATENT DOCUMENTS

| | | | |
|---|---|---|---|
| 2010/0214084 A1* | 8/2010 | Haste, III | B60L 1/00 340/426.11 |
| 2010/0287038 A1* | 11/2010 | Copejans | G07B 15/063 705/13 |
| 2011/0313593 A1* | 12/2011 | Cohen | G01S 5/0027 701/2 |
| 2012/0029758 A1* | 2/2012 | Proefke | G08G 1/205 701/31.4 |
| 2012/0258731 A1* | 10/2012 | Smith | H04W 4/025 455/456.1 |
| 2013/0006769 A1 | 1/2013 | Schalk et al. | |
| 2013/0066757 A1* | 3/2013 | Lovelace | G06Q 10/0838 705/35 |
| 2013/0132268 A1* | 5/2013 | Cooper | G06Q 40/025 705/38 |
| 2013/0226795 A1* | 8/2013 | Hopper | B60R 25/09 705/44 |
| 2014/0032402 A1* | 1/2014 | Stern | G06Q 20/14 705/40 |
| 2014/0172576 A1 | 6/2014 | Spears et al. | |
| 2015/0019304 A1* | 1/2015 | Vakili | H04W 12/06 705/13 |
| 2015/0134453 A1 | 5/2015 | Jhunjhnuwala | |
| 2015/0142572 A1 | 5/2015 | Vijayakrishnan | |
| 2015/0298653 A1* | 10/2015 | Schwartz | B60R 25/045 701/2 |
| 2016/0078759 A1* | 3/2016 | Nerayoff | G06Q 20/145 701/3 |
| 2017/0023377 A1* | 1/2017 | Burtner | G01C 21/3676 |
| 2017/0057462 A1* | 3/2017 | Lykkja | G08B 21/0205 |
| 2017/0066408 A1* | 3/2017 | Nyalamadugu | B60R 25/10 |
| 2017/0186257 A1* | 6/2017 | Gerlach | G07C 9/00309 |
| 2017/0294114 A1* | 10/2017 | Reiser | B60R 25/24 |
| 2018/0107891 A1* | 4/2018 | Schmidt | G06K 9/3258 |
| 2018/0137356 A1* | 5/2018 | Nerayoff | G06Q 20/145 |

OTHER PUBLICATIONS

Office Action from U.S. Appl. No. 14/213,419 dated Oct. 23, 2015.
Office Action from U.S. Appl. No. 14/213,419 dated Dec. 9, 2015.
Final Office Action from U.S. Appl. No. 14/213,419 dated Feb. 12, 2016.
Office Action from U.S. Appl. No. 14/213,419 dated Apr. 27, 2016.
Web Page from "Digital Recognition Network" dated Apr. 12, 2010.

* cited by examiner

SYSTEM AND METHOD FOR VIOLATION ENFORCEMENT UTILIZING VEHICLE IMMOBILIZATION

CROSS-REFERENCE TO RELATED APPLICATIONS

This application is a divisional application of Ser. No.14/213,419, filed on Mar. 14, 2014, entitled "System and Method for Violation Enforcement Utilizing Vehicle Imobilization" which claims the benefit of priority from provisional patent application Ser. No. 61/790,343, filed on Mar. 15, 2013, and is a continuation-in-part of prior U.S. patent application Ser. No. 13/230,507, filed on Sep. 12, 2011, which claims the benefit of priority from provisional patent application Ser. No. 61/409,623, filed on Nov. 3, 2010, each of which is hereby incorporated by reference in its entirety.

BACKGROUND OF THE INVENTION

Technical Field

The present disclosure relates to systems for violation enforcement utilizing vehicle immobilization. In particular, this disclosure relates to systems for locating vehicles subject to repossession and for immobilizing the vehicles.

Background

Vehicles and other assets may be repossessed when a borrower is delinquent in payment of a loan or other contractual agreement. In a common scenario, if the borrower cannot timely service the loan and is delinquent in payments, the creditor may seek to repossess the vehicle or other asset, either directly or more commonly, through an affiliated repossession company.

The borrower may willingly relinquish possession of the vehicle or asset to the repossession company. In such circumstances, the repossession company may take possession of the vehicle or asset at the debtor's residence. In other situations, the debtor may not willingly relinquish possession of the vehicle or asset and, in the case of vehicles, may hide the vehicle or otherwise maintain the vehicle at an undisclosed location away from his or her place of residence. This renders it difficult for the repossession company to locate the vehicle.

Further, when a vehicle to be repossessed cannot be easily located, agents, "skip-tracers," and "spotters" associated with the repossession company may randomly view the license plates of vehicles in areas known to be frequented by the debtor, often based on the description of the vehicle. However this is very expensive, inefficient and time-consuming because the agent, spotter, or skip-tracer may have a set of documents for each vehicle to be repossessed, and must cross-reference the documents in his possession with each suspect license plate that he or she views while driving or while a passenger in a spotter vehicle. Additionally, using an agent, spotter, or skip-tracer is inherently unreliable because it necessarily depends on the agent, spotter, or skip-tracer's ability to locate and accurately identify a vehicle.

Moreover, even when vehicles are accurately located, field agents, spotters, or skip-tracers are often unauthorized and unable to immobilize the vehicle. A spotter or skip-tracer must often return to their place of business and contact a creditor to receive authorization to recover the vehicle and/or a tow company to come immobilize the vehicle. Consequently, even in the scenario where the spotter is successful in locating a vehicle, the borrower will often be able to relocate the vehicle before the vehicle can be repossessed. While some agents may have access to various vehicle boots or similar immobilization devices while in the field, the agents will still often lack authorization to immobilize the vehicles that they have identified. Further, even in the case where the agent is able to locate and immobilize the vehicle, the creditor or repossession company must still return to the vehicle in order to remove the immobilization device if the vehicle owner makes the necessary payments to bring the loan current. This further contributes to the expense and inefficiencies of the process.

SUMMARY

A system for violation enforcement utilizing vehicle immobilization is provided. The system includes a database configured to store identifying information for a plurality of target vehicles subject to immobilization. The system includes a license plate recognition device configured identify a plurality of vehicles and a geographic locations associated with each vehicle. A data server receives the data identifying the plurality of vehicles and the plurality of geographic locations associated with each vehicle. An output processor is in operative communication with the data server and the database and is configured to process the received data and to compare the received data to the stored identifying information for the plurality of target vehicles. The output processor is further configured to generate and transmit a notification to a recovery vehicle when identifying information for one or more target vehicles matches the identifying information for one or more vehicles in the received data.

In another aspect, a non-transitory computer readable storage medium is provided having stored therein data representing instructions executable by a programmed processor for violation enforcement utilizing vehicle immobilization. The storage medium includes instructions operative for storing data identifying a plurality of target vehicles subject to immobilization and receiving the data identifying a plurality of vehicles and a plurality of geographic locations associated with each vehicle. The storage medium includes instructions for comparing the received data to the stored data to determine one or more matching vehicles having the same identifying data, generating a notification containing the geographic locations from the received data and associated with the one or more matching vehicles having the same identifying data, and transmitting the notification to an immobilization agent.

In further aspects, a computer-implemented method using at least one processor for violation enforcement utilizing vehicle immobilization is provided. The method includes receiving identification information identifying a plurality of vehicles and associated geographic locations. The received identification is compared to the stored identification information for a plurality of target vehicles subject to immobilization. An alert containing the received identification information and associated geographic location is transmitted to a client device when the received identification information matches the stored identification for one or more target vehicle subject to immobilization. The target vehicle is immobilized using an immobilization device in response to the generated alert.

BRIEF DESCRIPTION OF THE DRAWINGS

The system may be better understood with reference to the following drawings and the description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
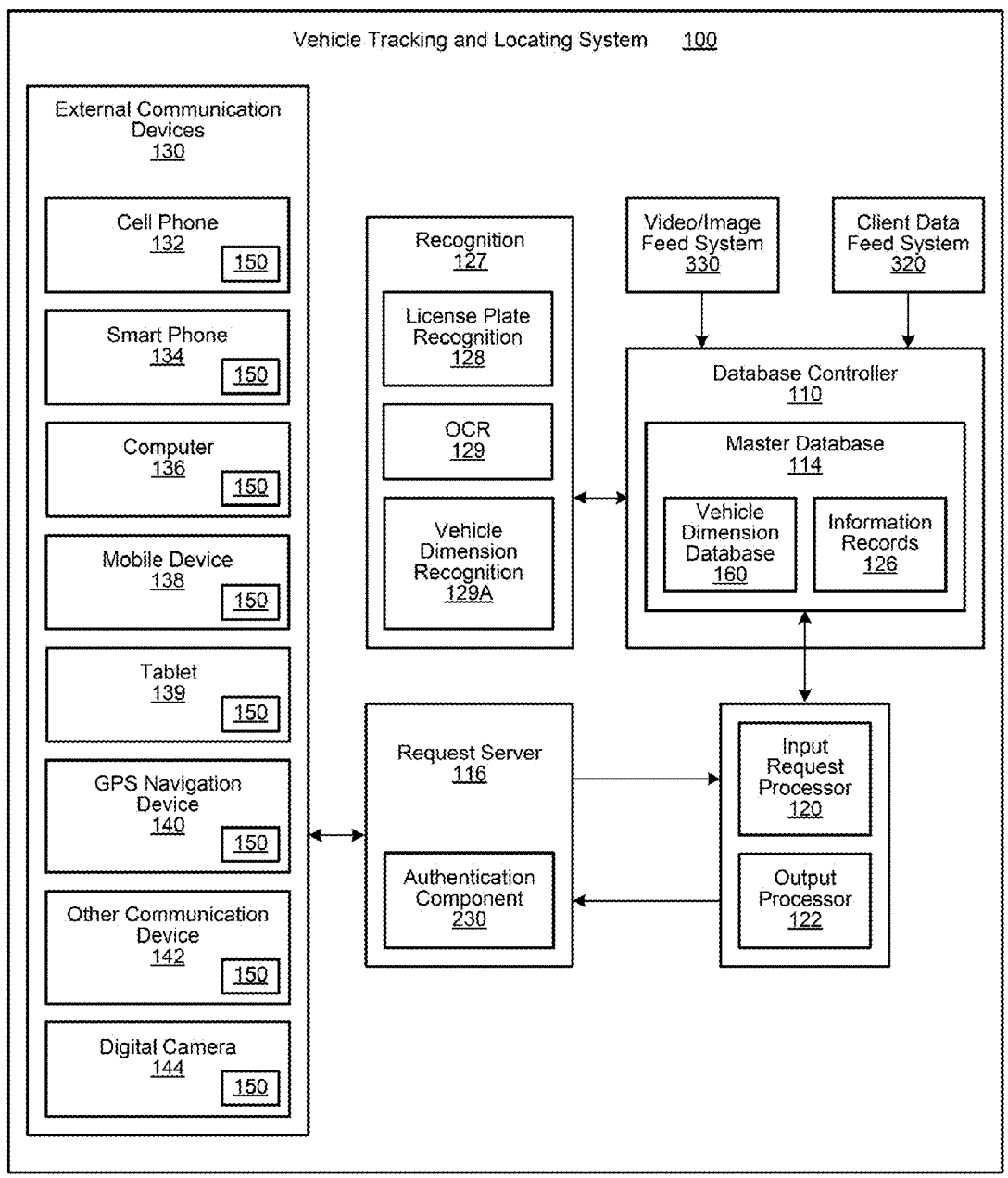
FIG. 1 is a block diagram of an exemplary vehicle tracking and locating system according to one embodiment.

By way of introduction, creditors may maintain portfolios of loans that include security interests in various assets, such as vehicles. These portfolios generally include vehicle loans that are in good standing, loans that may be approaching delinquency, or loans which may already be delinquent. When a debtor defaults on a loan obligation, creditors must often resort to repossessing the vehicle in order to recover a portion of the unpaid loan obligation. In order to seize the vehicle, the creditor must first locate the vehicle and dispatch an employee or agent to recover possession of the vehicle. In some scenarios, the creditor may have agreements with third-party towing and recovery companies to immobilize or recover vehicles subject to repossession. However, companies are still often required to employ the services of one or more spotter companies to locate vehicles and notify them when an asset the creditor has a security interest in is located. Even after locating the vehicle, the creditor is often required to submit an order to repossess the vehicle and dispatch a recovery vehicle. During this time, the vehicle of interest is often relocated by the debtor and the creditor incurs additional expense and setbacks in locating the vehicle.

Creditors and parking management services, as well as similar institutions having a right to immobilize a vehicle (collectively referred to herein as "creditors"), may benefit from the processes and methods described by the present description in order improve current immobilization processes and introduce efficiency into locating and immobilizing vehicles or other assets subject to repossession. In particular, the present description describes automatic license plate recognition (ALPR) systems that may be utilized by the system to identify vehicles of debtors that are in default of their loan obligations or vehicles having outstanding parking violations. ALPR systems may be used by immobilization agents employed by or having contractual relationship with the system administrators to scan license plates of parked vehicles, as well as those in transit. The data may be transmitted to and aggregated by the system, and processed in order to notify creditors when assets have been located. Advantageously, the system may transmit notifications to the creditors as well as immobilization agents that are located in the field to notify them that an ALPR system has recognized a vehicle of interest. The system may then transmit the location of the vehicle, as well as directions thereto or other compliance information, to the immobilization agent or a recovery vehicle.

The immobilization agent or recovery vehicle may navigate to the location received by the system and identify the vehicle subject to immobilization. Once the target vehicle is located, the agent can receive remote authorization from the system that the vehicle may be immobilized. In some embodiments, the agent may have access to various immobilization devices that have telecommunication components and may communicate with a central server, such as via a transmitter and a receiver and a wireless network, which may be the Internet. A wireless network may also include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable radio-frequency (RF) or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

In any event, the telecommunication components allow the immobilization devices be remotely activated and deactivated by receiving a signal from a central server. The agent can attach the immobilization device to the vehicle and may also have access to a mobile printing system that allows the agent to print out notices to place on the vehicle. The notices can provide the debtor with information required to deactivate the immobilization device, as well as serve to satisfy and regulatory requirements. For example, the notice may contain contact information for initiation a remote payment of the past due balance on the loan. The debtor may be required to accept certain terms of agreement to initiate a remote payment and remobilization of the vehicle, such as those that may be printed on the notice or otherwise communicated to the debtor when making the payment. Once the terms have been accepted and the payment made, the system may send a signal to the immobilization device to initiate remote deactivation. Alternatively, the system may transmit a code to the debtor that can be entered on a keypad of the immobilization device to deactivate the device.

In some embodiments, the terms of agreement may include the requirement that the debtor return the immobilization device to the creditor or system administrator and place a deposit on the device until the return is completed. Creditors or system administrators may maintain containers located throughout the geographic area in order to allow the borrower to return the immobilization device to a convenient location. The containers may contain wireless or keypad entry devices to allow the debtor to access the return bin. For example, the containers may utilize low-frequency radio-frequency (RF) detectors that recognize RF signals emitted from the immobilization device in order to allow the container to recognize that an immobilization device has been properly received. Once the device has been received, the system can return any deposit that the debtor placed on the device. In other embodiments, the server may communicate directly with one or more onboard computers of the vehicle, such as by using wireless functionality supported by a vehicle entertainment bus. In this case, the agent or recovery vehicle may simply confirm that the vehicle has been located and may place the required notices on the vehicle to complete immobilization.

FIG. 1 illustrates a vehicle tracking and locating system 100 that permits a user to obtain information relating to a vehicle of interest. A vehicle of interest may be a stolen vehicle, a vehicle subject to repossession, or any vehicle for which further information is sought by the user. A vehicle of interest may also relate to any vehicle associated with a marketing effort or advertising campaign.

The vehicle tracking and locating system 100 includes a database controller 110 in operative communication with a master database 114, a request server 116 configured to receive a data request from a user or agent, an input request processor 120 operatively coupled to the request server 116, and an output processor 122 operatively coupled to the request server 116 and configured to provide data of interest from information records 126 stored in the master database 114.

A recognition module 127, may be operatively coupled to the request server 116 and to the database controller 110, and may further include a license plate recognition system (LPRS) 128 or ALPR system (automatic license plate recognition), an optical character recognition system 129, and a dimensional recognition system 129A.

Users may communicate with the request server 116 using a variety of remote or external communication devices 130 to transmit a data request to the request server 116 regarding a particular vehicle of interest. The external communication devices 130 may be wireless devices and/or wired devices, such as cellular telephones 132, smart phones 134, computers 136, mobile devices 138, tablets 139, a GPS navigation device 140, or any suitable communication device 142. The user may transmit a data request by inputting: a vehicle identification number (VIN), a license plate number, a photographic image of a license plate or the vehicle itself, or a video containing images of the vehicle and its associated license plate, as captured by the communication device 130 or by a digital camera 144.

Figure 2:
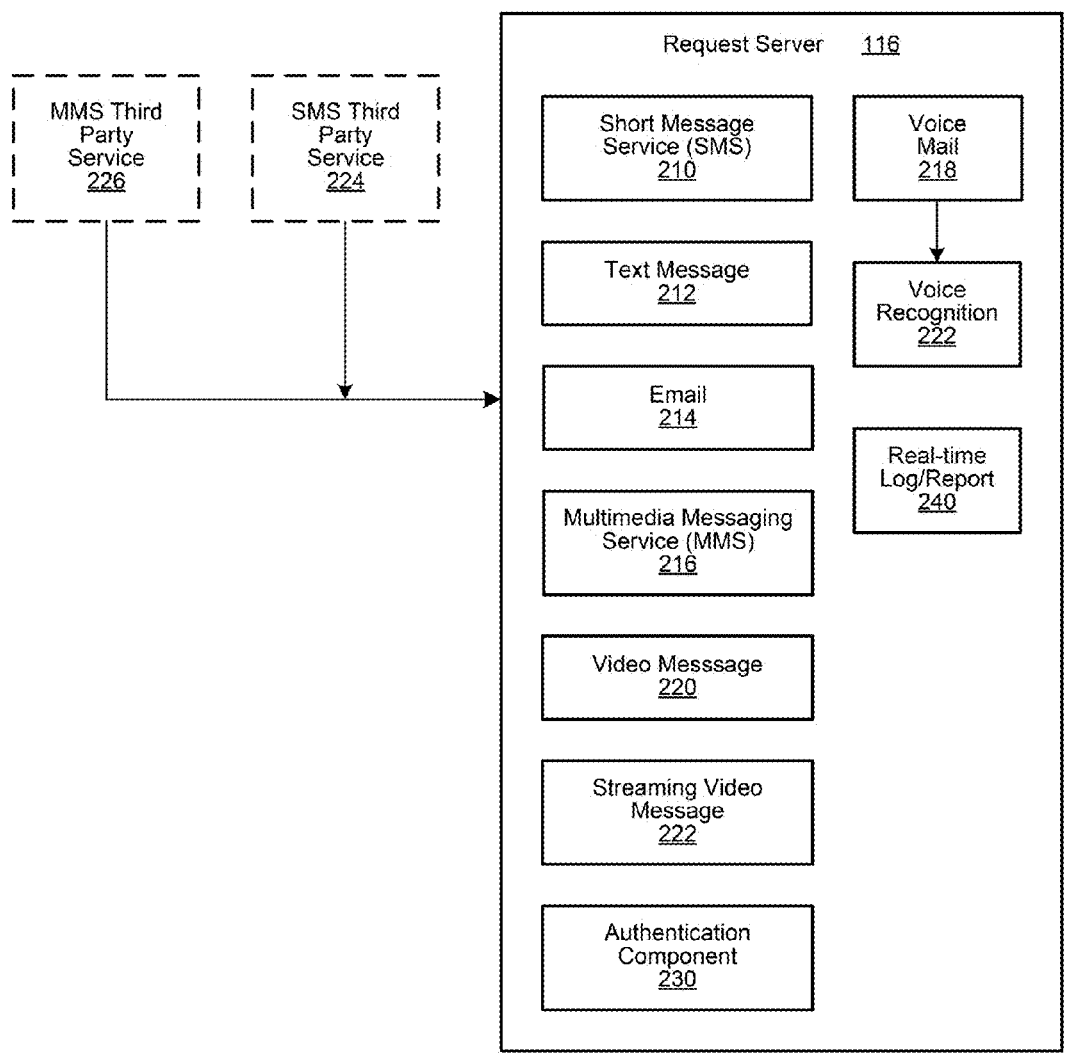
FIG. 2 is a block diagram of an exemplary request server according to one embodiment.

Referring to FIG. 2, when the request server 116 receives the request from the user, the request may be in a variety of different formats using different communication protocols depending upon the type of external communication device 130 that is used and the communication mode in which it is operating. The dataflow may include varied protocols and message formats handled by hardware or software modules or components, such as a short message service (SMS) module 210, a text message module 212, an email message module 214, a multimedia message service (MMS) module 216, a voicemail (VM) module 218, a video module 220, or a streaming video module 222, for example. Any suitable component or module may be used to decode, format, and process the message received. The SMS module 210 may be a SMS server dedicated to receiving and processing SMS communication, while the MIMS module 216 may be an MMS server dedicated to receiving and processing MIMS communication.

Each of the requests or messages from the user is preferably decoded and handled by the input message component or handler directed toward that particular protocol or message format. Further, a voice recognition system 222 may be coupled to the voicemail module 218 to convert the voice message into a text message so that the text message can be provided to the request server 116. The request server 116 may include an authentication component 230 configured to verify and authenticate that the requesting user is authorized to access the vehicle tracking and locating system 100. A real-time log 240 may also be generated and maintained by the request server 116.

Such input message modules (210, 212, 214, 216, 218) or handlers, whether hardware, software, a combination of hardware or software, may be resident within the request server 116 or within another component of the vehicle tracking and locating system 100, or may be separate and independent from the vehicle tracking and locating system 100.

Alternatively, some input message components or handlers, services, and functions may be provided by a third-party or third-party component. The short message service (SMS) service module 210 may be provided by or replaced by an independent third-party SMS messaging service 224, and may be external to the vehicle tracking and locating system 100. The third-party SMS messaging service 224 may be provided by an entity referred to as "TextMeForBusiness.com." Such third-party SMS providers 224 essentially host the SMS transactions and provide the necessary infrastructure to manage and service the SMS transactions, such as text to screen formatting, auto-response, message formatting, and other features. Such third party providers receive the data request from the external communication devices 130, and decode, extract, format, and forward the user message to the request server 116.

Similarly, a third party MIMS (multi-media service) provider 226 may replace the multi-media messaging service module 216 in the request server 116, and may be external to the vehicle tracking and locating system 100. Such third-party MMS providers 226 essentially host the MIMS transactions and provide the necessary infrastructure to manage and service the MMS transactions, such as text to screen formatting, auto-response, message formatting, and other features. Such third party providers receive the data request from the external communication devices 130, and decode, extract, format, and forward the user message to the request server 116. As referred to herein, the SMS service module 210 may be used interchangeably with the SMS third party provider service 224 because the end result is essentially similar, that is, the message is received and processed. Similarly, the MMS service module 216 may be used interchangeably with the MMS third party provider service 226.

As an overview regarding the user process for accessing the vehicle tracking and locating system 100, the following example involves use of the SMS format, but is applicable to any embodiment utilizing a different message format. In this example, the user may type a plurality of digits, such as a multi-digit access code, into the external communication device 130, such as a cellular telephone 132, smart phone 134, or any other communication device, which directs the call to the short message services (SMS) module 210 or to the SMS third party provider 224, for example. In response, the SMS module 210 or the SMS third party service provider 224 requests that the user provide a query, assuming that the user is authorized to access the system.

The user or agent may respond by entering "plate=333ABCD." This informs the vehicle tracking and locating system 100 that the user is inquiring about a license plate number. Alternatively, the user may respond by entering the VIN number. Further, the user may respond by attaching a photographic image, a video stream, or any attachment containing the license plate number for which further information is desired, as will be discussed in greater detail below.

The SMS third party service provider 224 decodes and formats the request to the request server 116, which in turn, obtains the requested information from the master database 114 via a database lookup. If the requested license plate number is found in the database, information about the corresponding vehicle is provided to the user via the SMS third party service provider 224 or in another format as provided via output processor 122. Such information includes, for example, data about a possible repossession action or stolen vehicle action, the registered owner of the vehicle, name of debtor or lien-holder, lien status, vehicle insurance status, vehicle year, vehicle make, vehicle model, vehicle color, VIN number, associated finance company, date that vehicle entered a repossession list or a stolen vehicle list, case number, location status (address and/or GPS coordinates), law enforcement status (stolen, owner APB, predator in a restricted area, etc.), and the like. Also, when a match is found, the system may transmit an electronic copy of the documents corresponding to the vehicle of interest.

Figure 3:
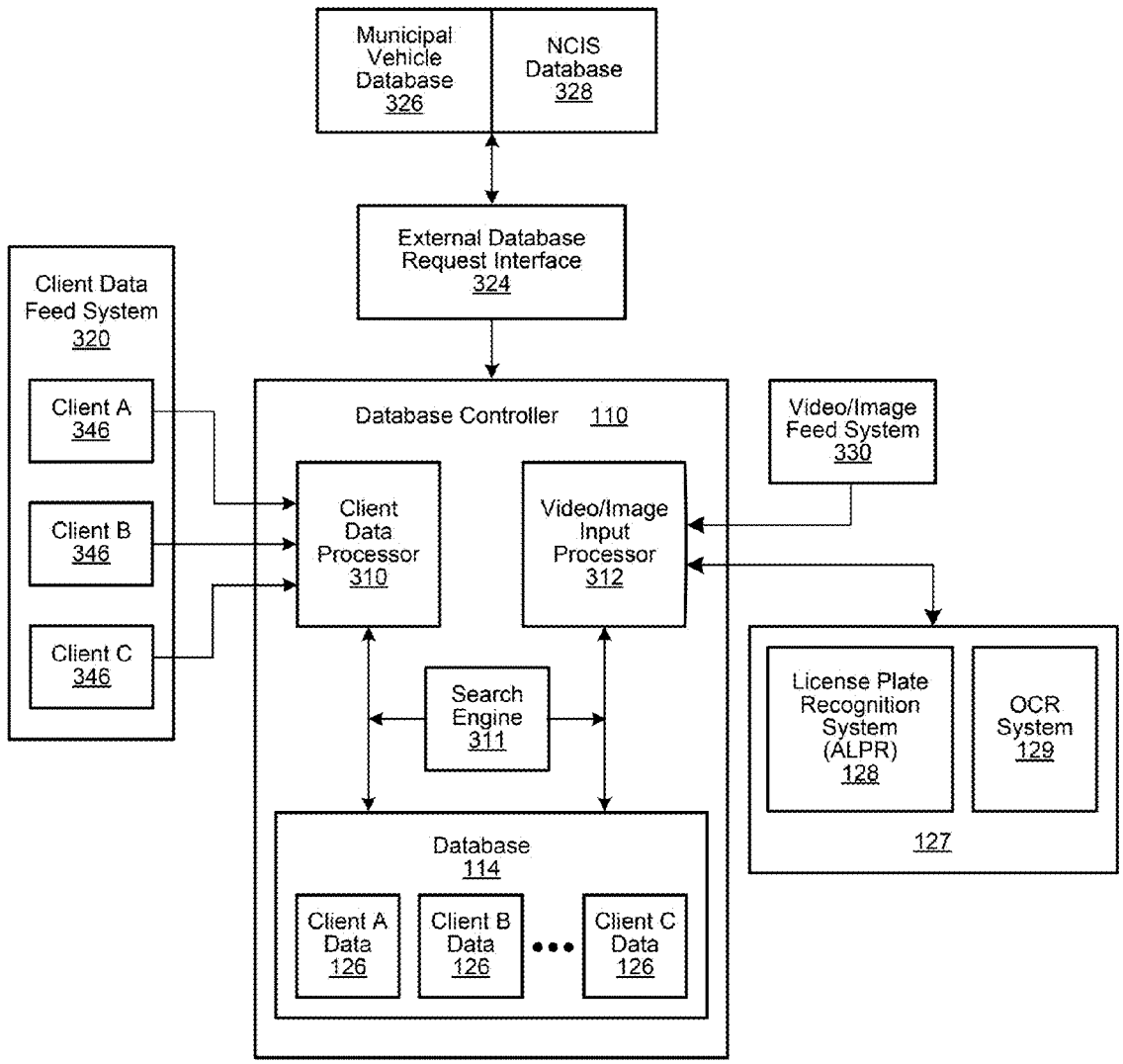
FIG. 3 is a block diagram of an exemplary database controller according to one embodiment.

Referring to FIG. 3, one embodiment of the database controller 110 is illustrated. The database controller 110 includes a client data processor 310, a search engine 311, and a video and image input processor 312 operatively coupled to the master database 114. The client data processor 310 may receive input from a client data feed system 320, while the video and image input processor 312 may receive input from a video/image feed system 330, the license plate recognition system 128, and an optical character recognition system 129.

The master database 114 may be updated based on input from the client data feed system 320, which includes multiple "clients" 346. Such clients 346 may represent the various credit companies, banking entities, finance credit companies, vehicle credit agencies, and law enforcement agencies, which may have agreements in place with owner of the vehicle tracking and locating system 100. Such clients 346 or third-party entities provide data to the master database 114 through the database controller 110 based on vehicles that are subject to repossession for nonpayment of loans with respect to banking and credit agencies, while law enforcement may provide additional data with respect to stolen vehicles. Alternatively, the database controller 110 may access remote databases through an external database request interface or communication link 324. The database controller may request information from external databases, such as municipal vehicle databases 326 and the National Crime Information Center (NCIC) database 328, which maintains a record of all vehicles reported stolen in the United States, and other municipal, state, and Federal databases.

The client data feed system 320 facilitates data transfer from the clients 346, including documents and messages. The data may be in the form of CSV files (comma separated value), PDF documents, or may be any suitable data format. The database controller 110 may create, update, and/or delete information records in the master database 114 based on the information received from the clients 346. The documents and data may be transmitted using standard file transfer protocol, such as FTP, for example.

In one specific embodiment, the master database 114 may be segmented or divided into separate logical data areas corresponding to the specific client source. For example, a first client may be TRW Credit Corp., while a second client may be GE Credit Corp. The master database 114 may be segmented for security and privacy considerations because if a vehicle is subject to repossession with respect to a first client, only repossession agencies authorized by that first client are permitted to access the corresponding information and engage in action related to the repossession of the subject vehicle.

In some embodiments, a user may be denied information about a vehicle subject to repossession if that user is not authorized by the client 346. Thus, in one embodiment, such a user may not even be informed by the vehicle tracking and locating system 100 that a requested vehicle license plates corresponds to a vehicle subject repossession if that user is not authorized by the client to receive such information. Accordingly, even if a particular vehicle is subject to a repossession order, if the user inquiring about that that license plate number is not a member of one of the repossession companies authorized to handle repossession of that car, that user may not receive an affirmative indication that the vehicle is subject to repossession. Alternatively, the user may be given an indication that the vehicle is subject to repossession but that the requesting user is not authorized to go forward with the associated repossession.

In other embodiments, rather than logically or physically segmenting the master database 114, the information records 126 may instead be tagged or associated with the corresponding client 346. The search engine 311 may inspect the associated client identifier and provide requested information only if there is a match between the information record associated with the client 346 and the authorization status of the user requesting the information.

The database controller 110 may provide access to the master database 114 on a multi-tier basis. For example, authentication and access may be provided based on three access levels, such as a master administrator level, a manager level, and a user level, each with different privileges and access rights.

Master administrator rights are typically granted to selected employees of the company that own and control the master database 114. The master administrator determines which users and managers are able to obtain data regarding vehicle subject repossession based upon arrangements between clients 346 and the third-party repossession companies.

The master administrator is responsible for accepting or pre-authorizing dial-in telephone numbers, authorized IP addresses, or other external communication device 130 identifiers corresponding to the various users. The master administrator can create, delete, and manage the user-level and the manager-level accounts. Further, the master administrator may set a particular maximum number of users and managers in the vehicle tracking and locating system 100.

The master administrator may also access the real-time log 240 that is maintained by the vehicle tracking and locating system 100. The real time log 240 may record all of the queries requested by the users, and all the responses provided to the users. The report may indicate the frequency of successful license plate number matches and statistics surrounding the matching process, such as the number of matches per 100 queries, and the like. Such statistics may also include geographical data so that the success rate for matches can be correlated with various geographical locations.

The manager-level entity is typically a member of an external repossession company, which may employ for example, ten users, agents, or drivers. A technician at the external repossession company may be considered to be a manager, and such a manager is typically able to provide authorization to the various users or drivers, under authorization from the master administrator.

Figure 4:
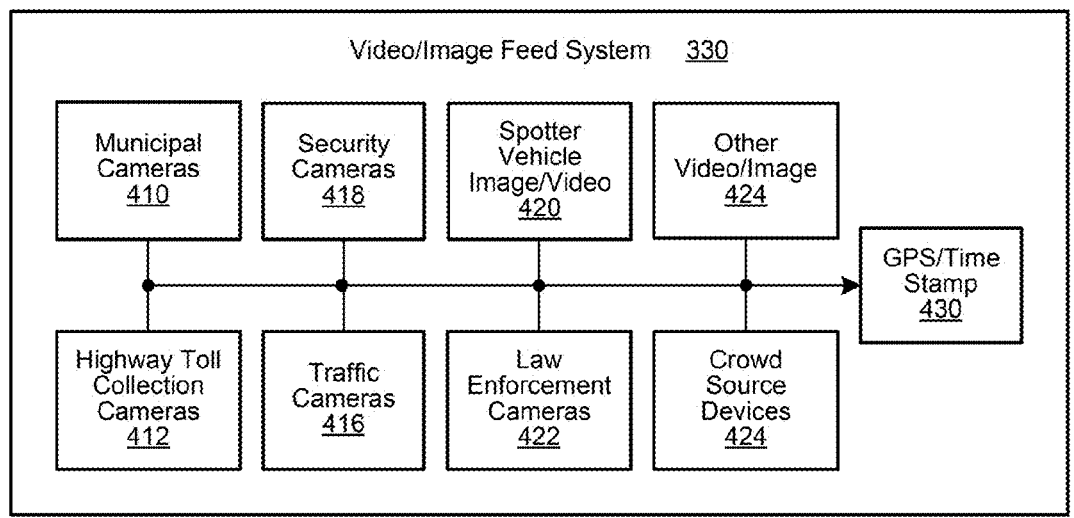
FIG. 4 is a block diagram of an exemplary video and image feed system according to one embodiment.

The video and image input processor 312 of the database controller 110 receives video and image data from the video/image feed system 330. The video/image feed system 330 is shown in greater detail in FIG. 4. The video/image feed system 330 provides a real-time data stream of license plate data for storage in the master database 114.

The video data and image data may be received from a plurality of sources, such as from municipal cameras 410, highway toll-collection cameras 412, traffic cameras 416, security cameras 418, spotter vehicle cameras 420, law enforcement cameras 422, "crowd-source" external devices 424, and other video image capture devices 424, which may correspond to mobile image capture devices or fixed image capture devices. Spotter vehicle cameras 420 are typically mounted on "spotter cars" and/or tow trucks, which may continuously capture images of vehicles and their license plates as the spotter vehicles drive along streets, travel through parking lots, and along other access routes.

Once the images of the vehicles and their license plates are captured, by whatever means available, automatic license plate recognition processing may be applied to the images to isolate, extract, and identify the license plate number prior to storage in the master database 114, along with the time and date that the image was captured, and including the geographical location or coordinates of the image capture. To facilitate this process, the license plate recognition system 128 (ALPR) and the OCR system 129 may be operatively coupled to the video and image input processor 312.

The automatic license plate recognition system (ALPR) 128 may be a commercially available recognition system embodied either in hardware components and/or software components. For example, the license plate recognition system 128 may be commercially available from PIPS Technology, a Federal Signal Company, of Knoxville, Tenn. Software processing modules to facilitate ALPR may also be commercially available from Inex/Zamir of Knoxville, Tenn., under the name of Insignia software.

In one embodiment, the video images are transmitted with an indication of a time and date that the image was captured in addition to the geographic location where the image was captured. The geographic location may be provided by an associated GPS system 430 coupled to the image capture device. Alternatively, for fixed image capture devices, a known geographical location of the fixed camera may be transmitted, or an identifying number of the fixed camera may be transmitted so that the vehicle tracking and locating system 100 can assign a predetermined geographical location to the fixed image capture device.

As described above, the user may transmit a data request to the request server 116 by inputting a vehicle identification number (VIN) or a license plate number. Using the external communication device 130, such as a digital camera, the user may also capture an image of the license plate number and transmit a photographic image of a license plate number to the request server 116. A video stream may also be captured. The input request processor 120 may transmit the image or the video stream to the video and image input processor 312 of the database controller, which in turn, may utilize the license plate recognition system 128 and/or the OCR system 129 to convert the photographic image into a license plate number suitable for storage in the master database 114.

As described above, the user may direct an MIMS message to either the multimedia messaging service module 216 or to the MIMS third party service provider 226. The MMS data format is more complex than a text message because the information requested is usually embedded in an image or series of images (video stream), and must be extracted using some form of recognition processing, such as the license plate recognition system 128 and/or the optical character recognition system 129. Once the MIMS message has been received by the MMS service module 216 each image or each frame of the video stream is analyzed to locate and isolate the portion of the image that contains the license plate image.

The OCR recognition system 129 may be used to determine the particular portion of the image that contains characters, such as the license plate. The OCR recognition system 129 may crop and discard the portion of the image that is determined not to contain text data. The OCR recognition system 129 may be a color OCR system or an infrared OCR system. Alternatively, if the image as originally captured has a tight-focus, meaning that the image captured only includes the image of the license plate, the image may be transmitted directly to the license plate recognition system 128 without preprocessing by the OCR recognition system to isolate the license plate.

In another embodiment, the OCR recognition system 129 may be incorporated into the ALPR system 128. The ALPR system 128 may then analyze the image of the license plate to convert the image to alphanumeric characters representing the license plate number.

The following is an example of an agent or a spotter using a mobile device, such as a smart phone 134, to transmit MIMS data to the vehicle tracking and locating system 100. The agent or user may walk through parking garage or public area, or may be a passenger in a moving vehicle, and may point the hand-held mobile device 130 (external communication device) toward parked or moving vehicles to capture images of the license plates.

The smart phone 134 may be recording and saving the video stream in memory or may be streaming the video in real-time through a cellular connection to the MMS third party service provider 226 or the MMS service module 216. In this way, each image or sequence of images is processed by the vehicle tracking and locating system 100 to isolate the plurality of license plate numbers captured.

Each license plate number captured is forwarded to the database controller 110 to perform a data match and or save the data if it does not exist in the database 114. Preferably, all license plate numbers are saved in the master database 114 along with the time that the image was captured and the location of capture based upon the GPS tag associated with the data transmission.

In one embodiment, to reduce the storage requirements of the database 114, certain license plate numbers may be deleted if they are "stale," meaning that the associated timestamp is very old. Whether the external communication device 130 is streaming the video in real-time or whether it is transmitting the recorded video or still frame image at a later time from memory, the MMS module 216 analyzes the images on a frame-by-frame basis.

Turning back to FIG. 2, the request server 116 may provide the authentication component 230, which includes login control and verification. In one embodiment, the user is not required to affirmatively log-in. Rather, using caller-ID, IP address confirmation, or a similar process, the authentication component 230 may recognize the phone number or internet address of the caller or other identification of the external communication device 130, which has been preauthorized for acceptance by the authentication component 230. Each telephone or other communication device 130 is preferably authorized in advance for acceptance by the authorization component 230.

Alternatively, the authorization component 230 need be not be resident in the request server 116 or in the vehicle tracking and locating system 100, and may be provided by a third-party component or service, such as the SMS third party service provided 224 or the MIMS third party service provider 226 discussed above. Any third-party provider may assist in authenticating the user.

In another embodiment, when the user places a call to the request server 116, the request server transmits a display interface or GUI to the user, and the user may then provide a security code or other password to gain access to vehicle tracking and locating system 100. Of course, the third-party component or service such as the SMS or MMS third party service provider 224, 226 may also transmit the display interface or GUI to the user.

Once the user has transmitted a request to the request server and 116 and has been properly authenticated, the search engine 311 determines if the requested license plate number is found in the database, subject to the above-described criteria for permitting the user to obtain access to information. If a match is found, the output processor 122 organizes and transmits the data of interest to the user in one of a variety of possible formats, depending upon the format in which the request was received.

The data of interest may be transmitted as text, a synthesized voice message based on text, and may also be transmitted in the form of documents, such as in PDF format, JPG format, or document text format, or in other suitable electronic format. The data of interest may include information about the vehicle, including vehicle year, vehicle make, vehicle color, vehicle model, vehicle owner, lien holder, vehicle identification number, vehicle location history, case number, date of repossession action, reporting agency, credit agency, date stolen if applicable, and the like.

As shown in FIG. 1, each external communication device 130 may include a resident application or "App," 150 which is a specific plug-in or software module installed on the external communication device 130 to facilitate the above communication process. Preferably, the application 150 is installed on a smart phone, tablet, or other device having an operating system used by a large number of people. For example, mobile devices using the Google's Android™ operating system or Apple's iOS™ operating system may implement the application 150.

The application 150 increases the efficiency and flexibility of the system 100, minimizes use of customized hardware and software to reduce cost, and increases user or agent convenience, satisfaction, and efficiency. Such an application 150 may replace customized software modules, and provides a uniform interface to the user or agent. Further, because most external communication devices 130, such as smart phones 134, are GPS-enabled, images and video captured by such devices can be tagged with the GPS coordinates so that the location of the image (vehicle) captured is associated with its corresponding location.

Such applications 150 may be used by the agent, or by the members of the general population that receive compensation to provide video or images to the vehicle tracking and location system 100. This is referred to as "crowd-sourcing," that is, employing the masses or general population as spotters to participate in providing data to the vehicle tracking and locating system 100. For example, students may be paid a commensurate amount to record and/or stream video images of the areas in which they travel using external communication devices 130 they own.

Such video may be recorded for subsequent transmission, or may be transmitted in real-time to the vehicle tracking and locating system 100. The student need only download the application 150 to his or her mobile device and activate the application to permit the device to record any and all images. In one embodiment, the participating students or spotters may be paid a stipend depending upon the volume of recorded information. In another embodiment, to encourage higher-quality information, the students may be paid a percentage of fees received if the information provided by the student is used in an actual repossession or identification of a vehicle in question.

Embodiments of the vehicle tracking and locating system 100 are not limited to finding only vehicles of interest, such as vehicles subject to repossession. The vehicle tracking and locating system 100 may also find application in parking enforcement. For example, a parking enforcement officer or agent may have an external communication device 130, such as a smart phone 134, for which the above-described application 150 is installed.

The officer or agent may travel past many parked vehicles while the smart phone 134 streams video data or still photographs to the vehicle tracking and locating system 100, preferably in MMS format. Based upon a recorded images of the plurality of license plates, the vehicle tracking and locating system 100 may isolate, recognize and identify each license plate number and compare the license plate numbers to the municipal vehicle database 326 operated by a municipality or other government body. The municipal vehicle database 326 may contain records corresponding to vehicles having outstanding parking or other violations. The vehicle tracking and locating system 100 may also request data from the National Crime Information Center (NCIC) database 328.

Based on a match between the license plate number recognized and the license plate number contained in the database, the output processor 122 may provide an output to a parking meter enforcement agent that confirms that a vehicle scanned has outstanding tickets, and thus should be impounded or booted with a Denver Boot™ or similar immobilization device. The parking officer or agent may receive a graphic output or notification directly on the smart phone 134 or display device. Alternatively, the smart phone 134 may be coupled to a wireless or wired printer so that a hardcopy can be printed. If the officer or agent has printing capability, a further citation maybe printed and issued and a affixed to the vehicle in lieu of impoundment.

In another embodiment, the automatic license plate recognition system 128 (ALPR) may be used in conjunction with the dimensional recognition or object recognition system 129A so that the dimensions or general shape of the vehicle may be identified and quantified. In this way, a license plate number recognized can be compared to the municipal vehicle database 326 to verify that the license plate indeed belongs to that specific type of vehicle to which it is affixed. For example, once the license plate number has been recognized, the make and model of the vehicle may be obtained from the official vehicle registration database 326.

A vehicle dimension database 160 (FIG. 1) may be part of or may be included in the master database 114 or may be separate therefrom. The vehicle dimension database 160 may include information as to the overall dimensions of every make and model of vehicle. In operation, when the license plate recognition system 128 (ALPR) extracts the license plate number of a particular vehicle, it may instruct the database controller 110 to request the make and model of that vehicle from the municipal vehicle database 326 or other database containing official vehicle registration information, if such information is not already of record in the master database 114. Of course, the request for information from the municipal vehicle database 326 need not necessarily be made by the database controller 110, but rather, may be made by the request server 116 or other component of the vehicle tracking and locating system 100.

In one embodiment, for example, if the municipal vehicle database 326 indicates that the vehicle scanned is a Volkswagen, but the vehicle dimension database 160 indicates that the size of the vehicle corresponding to the license plate number is much larger than a Volkswagen, an alert can be issued indicating that the license plate may be stolen and is affixed to the wrong vehicle. The system may also use additional vehicle information retrieved from the dimension database 160 and municipal vehicle database 326, as well other public databases containing official vehicle information, to assist in identifying license plates that are affixed to the wrong vehicle. For example, the system may retrieve vehicle information relating to color, size, make, model, series, or any other identifying information and may use this information to identify license plates located on incorrect vehicles. The system may provide for automatic recognition and comparison of vehicle features, or may place potential matches in a queue for a system administrator to review and verify. In either scenario, the system can store the information identifying mismatched license plates as CPIC (correct plate, incorrect car) leads.

In another embodiment, the vehicle tracking and locating system 100 may provide a "proximity alert" for fleet and dispatch management. A "proximity alert" may generally be used in identifying vehicles of interest that are located near the various ALPR systems. However, a proximity alert may also be used in provide efficiencies in fleet and dispatch management by identifying agent devices that are within predefined proximity to a location of interest, which may be, for example, an address where a vehicle is frequently spotted. In this embodiment, the identity of vehicles of interest (whether subject to repossession or of interest for any reason, such as for marketing purposes) are downloaded or imported into a GPS navigation device 140, or map enabled smart phone 134 installed in the agent's or spotter's vehicle. Of course, the GPS navigation device 140, smart phone 134, or other suitable device must have a sufficiently large memory to accommodate all of the data. The GPS navigation device 140 may be a commercially available navigation device, such as those provided by Garmin Corporation.

The GPS navigation device 140 may then compare the current location of the agent's vehicle (in a real-time), against the location of all of the downloaded data corresponding to various vehicles or other locations of interest. The GPS navigation device 140 may then compare the location of each vehicle of interest in memory to the current location of the agent's vehicle to determine the distance from the agent's vehicle to the stored location data for the vehicle of interest, assuming the time stamp associated with the vehicle of interest is not "stale."

If the GPS navigation device 140 determines that the vehicle of interest is within a predetermined radius of the agent's vehicle, for example, within one mile, and the time stamp was relatively recent, for example, within five minutes, the GPS navigation device 140 may alert the agent and direct the agent to the last known location of the vehicle of interest.

In that way, the agent could attempt to locate and track the vehicle of interest and take appropriate action. Of course, the predetermined radius and the time stamp differential (i.e., the current time minus the timestamp associated with the vehicle of interest) may be increased or decreased depending upon the application and the scope of the agent's work. Also, to keep the data "fresh," or up-to-date, the information corresponding to the vehicles of interest are preferably downloaded to the GPS navigation device 140 periodically, such as every 5 minutes, for example.

Alternatively, the data corresponding to the vehicles of interest need not be downloaded and remain resident in the GPS navigation device. Rather, the GPS navigation device may communicate in real-time with the vehicle tracking and location system 100, and may transmit the current location or coordinates of the agent's vehicle to the vehicle tracking and location system, for example every 30 seconds. The vehicle tracking and location system 100 may then compare the location of the agent's vehicle to all of the vehicles of interest in the database 114 based upon the location of the vehicle of interest and the time that the vehicle of interest was spotted.

If the vehicle of interest was spotted within a predetermined radius of the current location of the agent vehicle, and if the time that the vehicle of interest was spotted was relatively recent (i.e. within the last 10 minutes, for example), the vehicle tracking and location system 100 may inform the agent through the GPS navigation device 140 or other alert methods that may be handled, for example, by output processor 122, including email, text message, or similar alert, that a vehicle of interest was spotted and may be close by. The GPS navigation device 140 may also provide navigational directions to the agent to facilitate pursuit of the vehicle interest, at least with respect to its last known location.

Note that the vehicle tracking and location system 100 may provide navigational directions to the agent or spotter should the agent not be in possession of a GPS navigational device. Based on the coordinates of a destination, reverse geo-coding can be applied to either the vehicle interest or the agent vehicle. Reverse geo-encoding means that once the GPS coordinates of a destination are known, a map or navigational directions, or an address can be transmitted to the agent's smart phone or other device. In one embodiment, a commercially available reverse geo-coding system, such as Google Maps™, Microsoft Bing On-Line™, Microsoft MapPoint™, Streets & Trips™, or MapQuest™, may be used.

The vehicle tracking and locating system 100 may be embodied as a system cooperating with computer hardware components and/or as computer-implemented methods. The vehicle tracking and locating system 100 may include a plurality of software modules or subsystems. The components, modules, or subsystems, such as the request server 116, the input request processor 120, the output processor 122, the database controller 110, the video and image input processor 312, the client data processor 310, the search engine 311, the license plate recognition system 128, the optical character recognition system 129 and other components and/or modules of the vehicle tracking locating system 100, may be implemented in hardware, software, firmware, or any combination of hardware, software, and firmware.

Such components, modules, or subsystems may or may not reside within a single physical or logical space. For example, the components, modules, or subsystems referred to in this document and which may or may not be shown in the drawings, may be remotely located from each other and may be coupled by a communication network.

Figure 5:
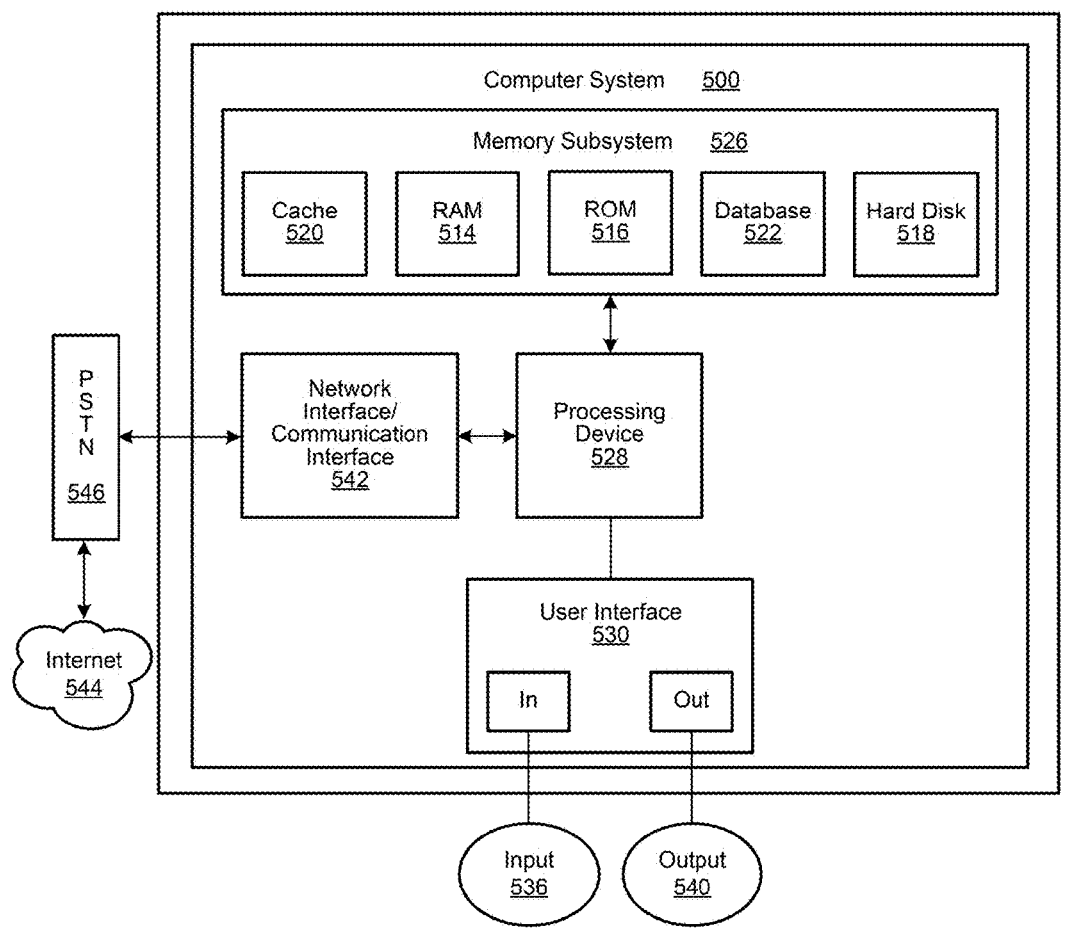
FIG. 5 is a block diagram of an exemplary computer system or server according to one embodiment.

FIG. 5 is a high-level hardware block diagram of one embodiment of a computer system hardware embodiment that may perform some or all of the functions of some of the components, modules, and/or subsystems described above. Such a computer system 500 may be embodied as a system cooperating with computer hardware components and/or as computer-implemented methods and is shown in FIG. 5 as a high-level hardware block diagram of a system computer 500 that may be used to execute software or logic to implement the processing of the components, modules, and/or subsystems described above.

The computer 500 may be a personal computer and may include various hardware components, such as RAM 514, ROM 516, hard disk storage 518, cache memory 520, database storage 522, and the like (also referred to as "memory subsystem 526"). The computer 500 may include any suitable processing device 528, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 528 may be an Intel Pentium® microprocessor, x86 compatible microprocessor, or equivalent device, and may be incorporated into a server, a personal computer, or any suitable computing platform.

The memory subsystem 526 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 530 may be coupled to the computer system 500 and may include various input devices 536, such as switches selectable by the system manager and/or a keyboard. The user interface also may include suitable output devices 540, such as an LCD display, a CRT, various LED indicators, a printer, and/or a speech output device, as is known in the art.

To facilitate communication between the computer 500 and external sources or other components, modules, and subsystems, a communication interface 542 may be operatively coupled to the computer system 500. The communication interface 542 may be, for example, a local area network, such as an Ethernet network, intranet, Internet, or other suitable network 544. The communication interface 542 may also be connected to a public switched telephone network (PSTN) 546 or POTS (plain old telephone system), which may facilitate communication via the Internet 544. Any suitable commercially-available communication device or network may be used.

Figure 6:
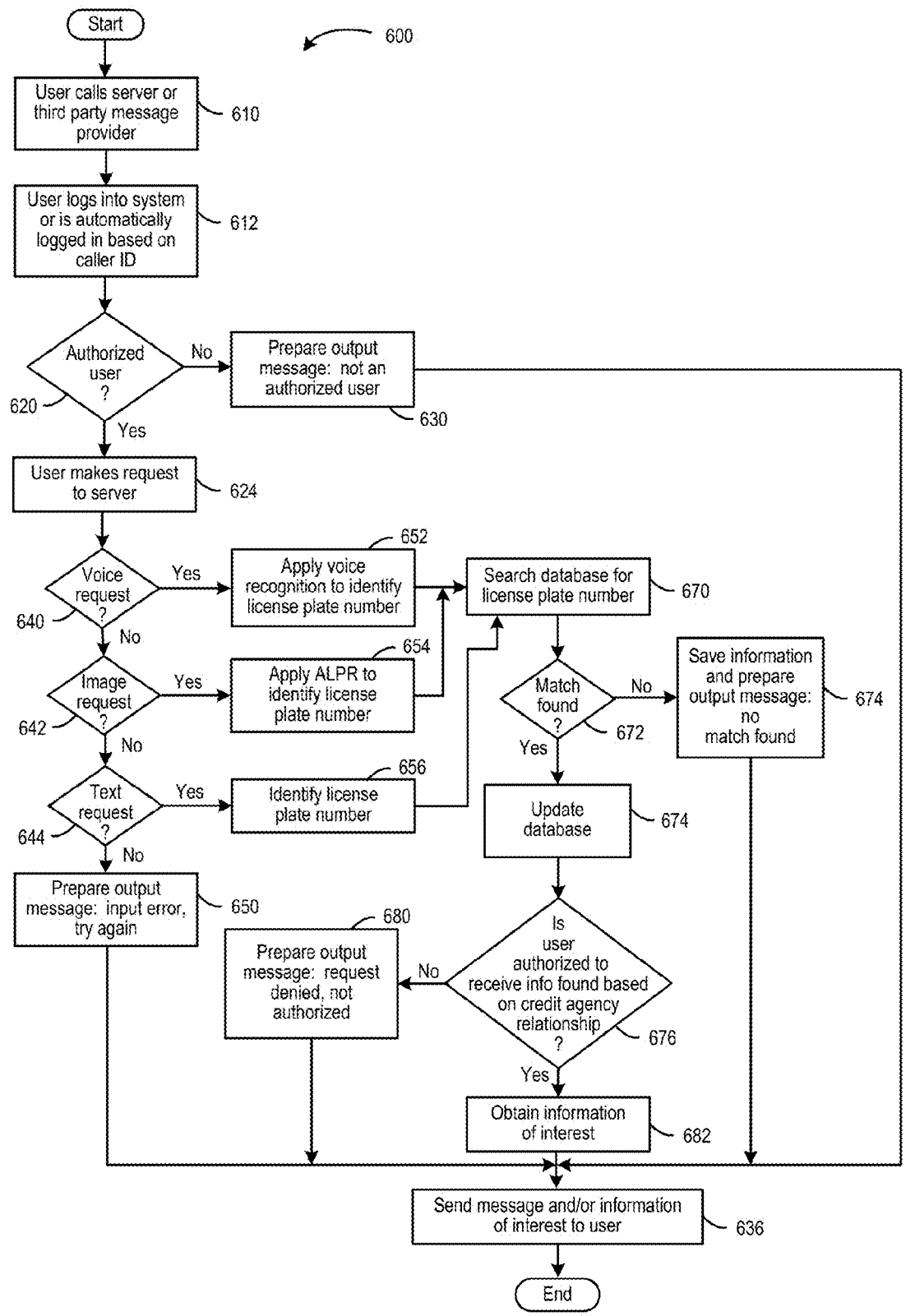
FIG. 6 is a flow diagram illustrating an exemplary process of the vehicle tracking and locating system according to one embodiment.

FIG. 6 illustrates a process 600 according to the vehicle tracking and locating system 100. In one embodiment, the user contacts the request server 116 using the external communication device 130, or calls the third-party provider service 224 based on the communication format (610). The user then logs into the vehicle tracking and locating system 100, or alternatively, is automatically logged in based on caller-ID, IP address, or other identifier (612) corresponding to the external communication device 130.

If the user is authorized (620) to access the vehicle tracking and locating system 100, the user then initiates a request (624) to the request server or third-party provider service 224. If the user is not authorized (620), an output message is prepared indicating that the user is not authorized (630), processing then branches to a component that outputs the prepared message (636), and the routine exits. The component that prepares and/or sends the output message, in some embodiments, may be the output processor 122.

The user may provide the request in a variety of formats, such as a voice request (640), an image request (642), or a text request (644). If the request is not in any of the required formats, an output message is prepared indicating an input request error, which requests that the user try again (650).

If the request is a voice request, voice recognition is applied to identify the text of the request (652), which corresponds to a license plate number. If the request is an image request where the user is transmitting a digital image of a license plate, automatic license plate recognition is applied to identify the license plate number in the request (654). If the request is an video request or streaming video request, the OCR system 129 isolates the portions of the images/frames containing the license plate and forwards the cropped portions to the license plate recognition system 128 so as to identify the license plate number in the request (654). If the request is a text message, license plate number in the message is extracted (656).

Once the license plate number of interest is been extracted and identified, the search engine 311 searches the master database 114 to determine if a match exists (670). In one embodiment, if the request contains video or photographic images, and if no match is found (672), the license plate number and associated information (such as location and time) are saved in the database so as to continuously build the database, and an output message is prepared indicating that no match has been found (674). Processing then branches to the component that outputs the prepared message (636), and the routine exits.

In one embodiment, if the request contains video or photographic images, and if a match is found in the master database (672), the master database is updated with respect to the location and time (674). Next, the matching record is inspected to determine if the user is authorized to view the matching information and/or engage in actions relative to the repossession of the vehicle for which a match is found (676). If the user is not authorized, an output message is prepared indicating that the user is not authorized and that the request is denied (680). Processing then branches to the component that outputs the prepared message (636).

If the user is authorized to view the matching information and/or engage in actions relative to the repossession of the vehicle for which a match is found, the information of interest is obtained from the matching database record (682), and an output message is prepared indicating that the information is available. The output message is then sent to the user along with the information of interest obtained from the database (636), and the routine exits.

In addition to the aforementioned uses of the methods and systems, the present disclosure describes a system that may be utilized for violation enforcement utilizing vehicle immobilization. In particular, the system described herein may be utilized for locating vehicles that are subject to immobilization, for example, by having outstanding parking violations, being involved in a crime or otherwise tracked by law enforcement agencies, or that may be subject to repossession for being delinquent on a loan. In particular, the system can be used to notify agents or recovery vehicles when ALPR systems have identified a vehicle that may be subject to immobilization. Additionally, the system may use proximity alerts to notify an agent that they are within a given distance to a location where a vehicle subject to repossession is likely to be located. For example, commonly owned U.S. patent application Ser. No. 14/213,176, which is hereby incorporated by reference in its entirety, describes processing historical ALPR data to generate and provide proximity alerts to various client devices when the devices are within predefined distances from locations of interests, such as locations where a vehicle has been frequently sighted or that is related to the registration information for the vehicle. The client devices may include various telecommunication devices in use by "agents" or "spotters" associated with the system or by contractors of third-party institutions having contractual agreements with the system administrator. The devices used by the agents, spotters, and can include any GPS enabled or telecommunication device capable of transmitting its location or being triangulated by the system, as well as the ALPR systems themselves that gather and transmit data to the central servers of the system.

ALPR systems may also be used by repossession companies, state municipalities, federal, state, and local governments, skip-tracers, and may be stationary recognition devices (e.g., street cameras) or mobile recognition devices (e.g., vehicle-mounted cameras). As previously discussed, these ALPR systems may randomly or systematically view the license plates of vehicles. The license plate recognition (LPR) data can be transmitted to a central server asynchronously or in real-time. The system can notify agents and recovery vehicles when a vehicle of interest, such as one subject to immobilization, has been located. The agent may or recovery vehicle can navigate to the location received by the system and identify the vehicle subject to immobilization. Once located, the agent can receive remote authorization from the system to immobilize the vehicle.

Figure 7:
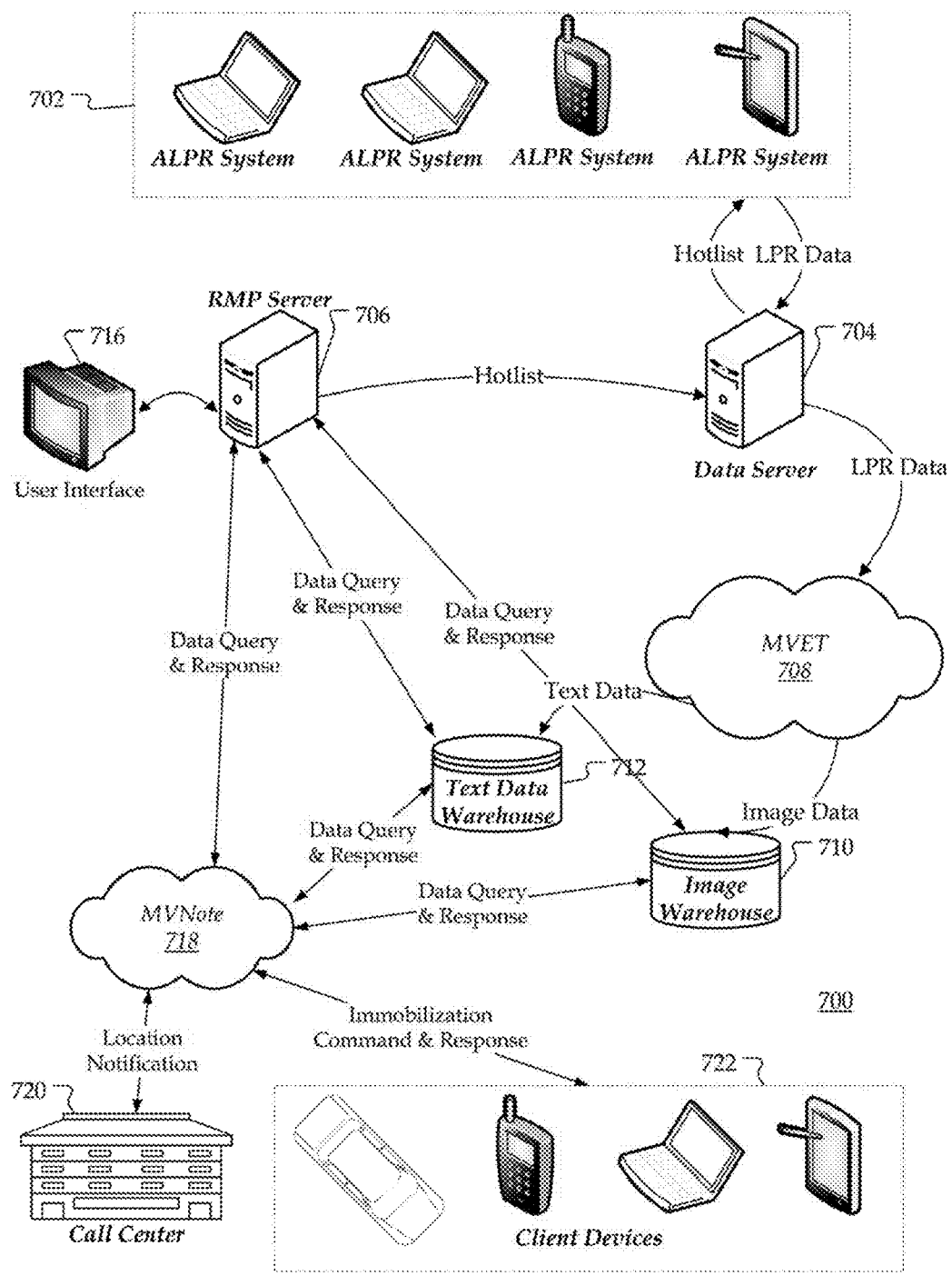
FIG. 7 is a block diagram of an exemplary data aggregation environment according to one embodiment.

Referring now to the figures, FIG. 7 illustrates an exemplary data aggregation environment 700 according to one embodiment. Data aggregation environment 700 includes ALPR systems 702 in operative communication with data server 704. ALPR systems 702 may be wireless devices and/or wired devices, such as cellular telephones, smart phones, computers, mobile devices, tablets, a GPS navigation device, or any suitable communication device. ALPR systems 702 may be mobile recognition systems, such as those mounted on vehicles, or stationary recognition systems, such as street and intersection recognition devices. ALPR systems 702 may be components of the same ALPR system 128 described in connection with FIG. 1, or may be additional components to those previously described. In either event, ALPR systems 702 aggregate LPR (license plate recognition) data and transmit the LPR data to data server 704. LPR data may include video images, fixed images, or other information that can be used by a vehicle tracking and locating system, such as vehicle tracking and location system 100 described in connection with FIG. 1 above.

Data server 704 stores the LPR data received from ALPR systems 702. Data server 704 may be a single data server and database or may consist of multiple distributed data servers and databases in operative communication over a network, such as the Internet. In certain embodiments, data servers 704 may be implemented in conjunction with manufacturer-specific tools or third-party server management tools. Example tools that data servers 704 may make use of include tools provided by 3M Back Office System Software™ or home-based server software provided by ELSAG™, and the like. Data server 704 may also receive or access data from third-party sources and manufacturers. For example, data server 704 may be in operative communication with municipal vehicle databases 326, NCIS databases 328, or receive data from client data feed system 320, as well as of other third-party entities. Data server 704 can be a cache server that aggregates and stores all LPR data from the various sources in a format that may be accessed by data extraction tools, such as MVET (Motor Vehicle Extraction and Transmission) tool 708.

In some embodiments, data aggregation environment 700 may include one or more MVET tools 708. MVET tool 708 is a data extraction and transmission tool that can be designed to overlay various components of data server 704 and may be integrated with any of the aforementioned manufacturer-specific or third-party server management tools. MVET 708 may be coupled to one or more processors, servers, and databases to perform the particular data extraction and data processing functionality to be implemented by the MVET tool. Data aggregation environment 700 may include multiple instances of MVET tool 708, each of which may be designed to overlay a subset of components of data servers 704. Regardless of the implementation of data server 704, MVET tool 708 is designed to access and extract data from data servers 704.

MVET tool 708 extracts LPR data from the data server 704. For example, MVET tool 708 may be designed to extract vehicle tracking information, including license plate images and license plate text. The LPR data may be processed by video and image input processor 312 which is operatively coupled to ALPR system 128 and the OCR system 129, as described in connection with FIGS. 1 and 3. MVET tool 708 may then divide and separate the images and text data. The system may use recognition software to identify additional text from the retrieved images. The image data can be transmitted to image warehouse 710 and the text data can be transmitted to text data warehouse 712. Image warehouse 710 and text data warehouse 712 may likewise consist of one of more servers and databases. Image warehouse 710 and text data warehouse 712 may be the same data warehouse, or each may consist of multiple distributed data servers and databases in operative communication over a network. An exemplary image data warehouse 710 may include web-based services, such as Amazon S3™. An example text data warehouse 712 may include one or more relationship databases, such as Amazon RDS™. Image data warehouse 710 and text data warehouse 712 may be cloud computing platforms, or may consist of similar offline storage platforms.

Data aggregation environment 700 may also include RMP (recover management pro) server 706. RMP server 706 may be the same server as data server 704 or they may be one or more distributed servers in operative communication over a network, such as the Internet. RMP server 706 is a web-accessible tool that may be in operative communication with image data warehouse 710, text data warehouse 712, MVET 708, and data servers 704. In some embodiments, RMP server 706 may also be in operative communication with MVNote 718, a system component responsible for generating alerts and notifications to be sent to various user devices. RMP server 706 may implement one or more web-based user interfaces 716. Web based interfaces 716 may be secure portals that allow a system user to access LPR data, such as the data stored in image data warehouse 710 and text data warehouse 712, and return results specific to that user's needs.

RMP server 706 allows the system to retrieve historical LPR data relating to one or more vehicles of interest. In this way, RMP server 706 provides a user interface that can be implemented in various configurations in order to provide a system user with an interface 716 for displaying historical LPR data in a way that suits that particular user's needs or business goals. For example, in the instance of a user wishing to locate a particular vehicle for repossession or immobilization, RMP server 706 may provide a mapping feature that displays historical vehicle views as flags or "hits" within a geographic area. The user interface 716 may also include one or more classifications describing an aspect of the vehicle views, such as the recency of the hit, time of day, frequency, or whether the vehicle was spotted having mismatched license plate data. In some embodiments, RMP server 706 may also generate a hotlist of vehicles of interest as well as hotlists of locations of interest. The hotlist is transmitted back to data servers 706 and downloaded or pushed to ALPR systems 702. In this way, ALPR systems 702 can receive up-to-date information for identifying vehicles of interest during use.

The hotlist may also be used by MVNote 718 to alert ALPR systems or other agent devices of their proximity to vehicles or other locations of interest. MVNote 718 includes an automated data processing and notification system that can be designed to overlay and interact with the various system components. MVNote 718 may include one or more processors and servers located on the same machine or that are in operative communication over a network, such as over the Internet. In some embodiments, MVNote 718 may include output processor 122 or may utilize request server 116 to communicate with a variety of remote devices, such as external communication devices 130. MVNote 718 may also be in operative communication over a network, with one or more call centers 720 and one or more client devices 722.

Client devices 722 may include wireless devices and/or wired devices, such as cellular telephones, smart phones, computers, mobile devices, tablets, a GPS navigation device, on-board vehicle computers with telecommunication capability, or any suitable communication device capable of transmitting a GPS signal and/or receiving system notifications. Client devices 722 may be the same devices as external communication devices 130, or may include additional devices capable of communicating their location to the system and receiving immobilization notifications and alerts. For example, client devices 722 may include telecommunication devices that are components of one or more vehicle busses or electronic control units, such as an entertainment bus, and that form components of a vehicle's on-board computer systems. Call centers 720 may include any business that has a contractual relationship or is otherwise associated with the system. Example call centers may include third-party institutions having various interests in immobilizing vehicles, such as repossession companies, vehicle recovery and salvage companies, creditor institutions, parking enforcement agencies, municipalities, law enforcement, and the like. Depending on the nature of the call center and third party institution, the immobilization process can be adapted to take into account the particular business goals and needs of that institution.

Figure 8:
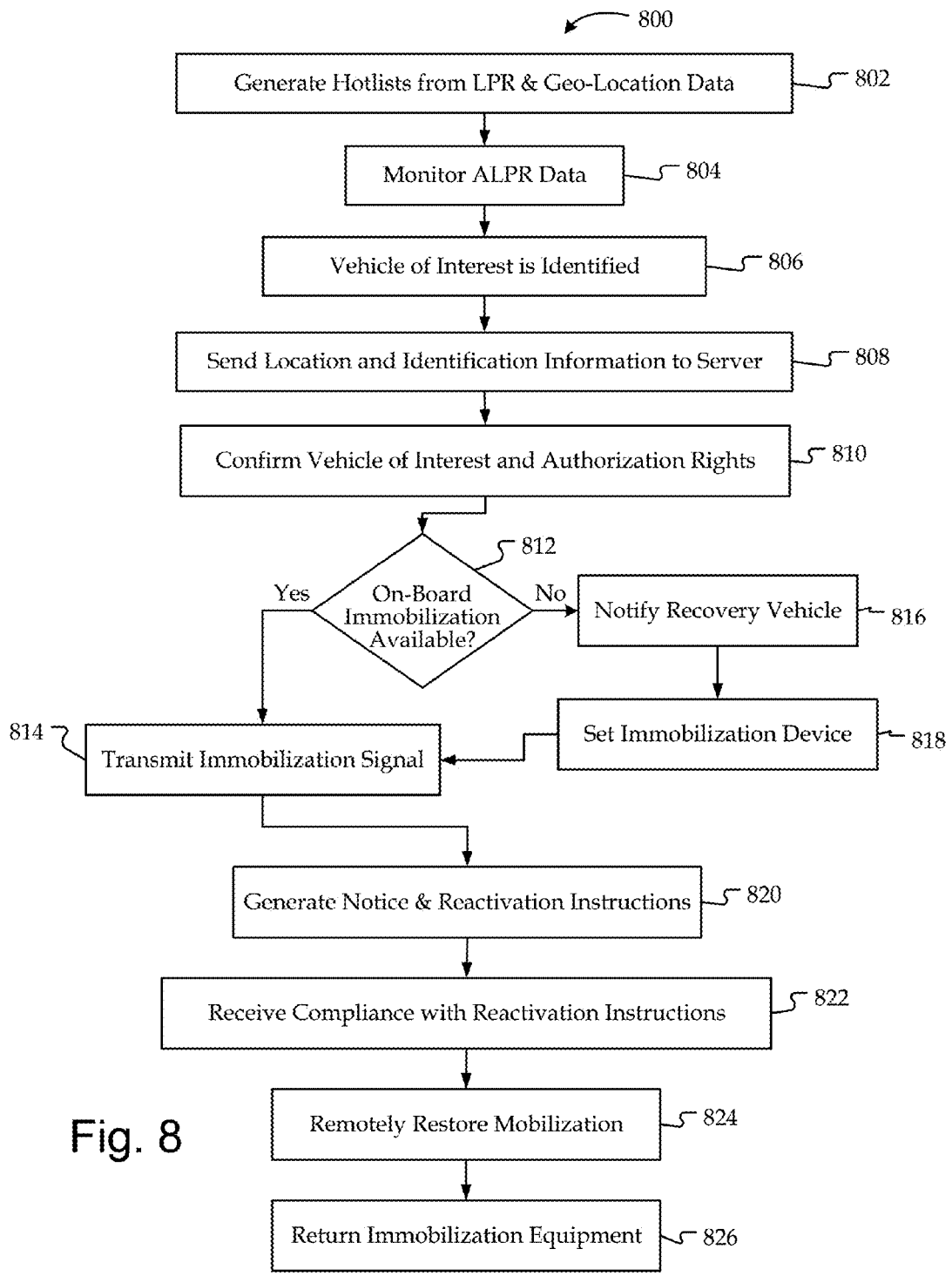
FIG. 8 is a flow diagram illustrating an exemplary process of utilizing vehicle immobilization according to one embodiment.

FIG. 8 illustrates an exemplary process 800 for utilizing vehicle immobilization according to one embodiment. In one embodiment, the system first generates hotlists from historical LPR and geo-location data transmitted from ALPR devices (802). As described in connection with FIG. 7, the hotlists may identify a number of vehicles of interests, such as those that are subject to repossession, as well as various locations of interests. The locations of interest may include geographic locations that are determined to be related to one or more of the vehicles of interest. For example, a location of interest may be a commercial or residential address where a vehicle has been frequently spotted by ALPR systems, or may be an address associated with the vehicle registration or owner. Once the hotlists have been generated, the system monitors the ALPR system being transmitted from various ALPR devices (804), which may include, for example, utilizing video/image feed systems 330 as described in connection with FIGS. 3 and 4. In some embodiments, the hotlists may be downloaded asynchronously and stored directly to the ALPR systems. In other embodiments, the ALPR systems may communicate with the data servers and transmit the LPR data in real-time.

In either scenario, the system may continually monitor the LPR data and geo-location data being generated by the ALPR devices in order to update the hotlists by adding or vehicles of interest as new information with respect to each target vehicle is received. The updated hotlists can be pushed to the ALPR device periodically. The ALPR device or system servers may then utilize the current version of the hotlist to identify vehicles of interest (806). For example, the ALPR systems may utilize recognition module 127, as described in connection with FIGS. 1 and 3, to scan the license plates of vehicles that are parked or transit. If the license plates match a vehicle of interest, the geo-location data and identifying information for the "hit" are transmitted to the server (808). One or more system components, such as the servers and processors of MVNote 718, can then process the LPR data and compare it to the records stored in the system databases to confirm that the vehicle is subject to immobilization and that the system administrators are authorized to immobilize the vehicle (810). In addition, the system may require a nearby agent to confirm that the vehicle is in fact located at the address where the LPR data was generated. The agent may be the operator of the ALPR device that spotted the vehicle or may be another agent or recovery that is in close proximity to the location where the hit was generated. In either case, MVNote 718 may generate a notification or "proximity alert" to be sent to a communication device of the agent or recovery vehicle, which may be the same client devices 722 described in connection with FIG. 7, instructing the agent to proceed to the address where the vehicle was spotted. Upon arrival, the agent may confirm with the system that the vehicle has in fact been located.

The system may next determine whether it is possible to remotely immobilize the vehicle of interest (812). For example, some vehicles may have telecommunication devices that are components of one or more vehicle busses or electronic control units, and that form components of a vehicle's on-board computer systems. These systems may provide the ability to remotely immobilize the vehicle upon confirmation that the vehicle is parked and can be safely immobilized. In this scenario, the system may directly transmit an immobilization signal to the on-board computer of the vehicle (814). If on-board immobilization is not available, the system can notify the agent or recovery vehicle that an immobilization device needs to be set on the vehicle (816). The agent or recovery vehicle can place the immobilization device on the vehicle, which may be a Denver Boot™ or a similar immobilization device (818). In some embodiments, the immobilization device may also include any aftermarket device, such as a transponder that may be placed on the vehicle to immobilize it. The immobilization transponder may include an immobilization controller that may be coupled to a telematics control unit. The telematics control unit may include a telematics controller that is preferably microprocessor based. The telematics controller may be coupled to a transmitter and a receiver. The transmitter and receiver may receive communications from a telecommunications network through an antenna. A suitable antenna may be used for the type of communications received. For example, antenna may be configured to receive satellite signals, wireless cellular signals or the like. In one embodiment, the system may utilize immobilization devices having low-frequency RF generator components in addition to telecommunication capabilities. The RF components may include a transmitter that generates sends an encoded or modulated digital signal to an antenna or receiver where the signals can be demodulated and decoded. The signals may also transmit a unique code or device identification number for the immobilization device, such that the device may be recognized by a drop-off bin as further described in connection with FIG. 12.

After the immobilization device has been set, the system may then transmit an immobilization signal directly to the immobilization device in a similar manner as done for the on-board immobilization device. Alternatively, the agent may directly activate the immobilization device once it has been placed on the vehicle. The ALPR device or field agent may also have a mobile printing system that allows the agent to print out notices to attach to the vehicle. The system can then generate the notice contents and reactivation instructions to be sent to the mobile printing system (820). The notices may contain any regulatory notice requirements for immobilizing a vehicle and may provide the debtor with information required to deactivate the immobilization device, such as a contact number for a call center where the debtor may initiate a remote payment of the past due balance on the loan. After the required notices are placed on the vehicle, the agent may leave the immobilized vehicle and the vehicle will remain immobilized until the system receives compliance with the reactivation instructions contained in the notice (822). Once compliance with instructions are received and payment is verified, the system may issue a second signal to the immobilization device remotely unlocking the device to restore mobilization of the vehicle (824). In some embodiments, the system may generate a code to the debtor allowing the debtor to enter the code on a keypad of the immobilization device to unlock the vehicle. As part of the terms of the agreement for remotely unlocking the vehicle, which may be contained in the notice placed on the vehicle, the debtor may be required to return the immobilization equipment to the system administrator and to place a deposit on the equipment. The system administrator may maintain a number of return containers or bins spread out throughout the local geographic area. The return containers may utilize low-frequency RF detection components or similar devices to detect when an immobilization device has been returned and placed in the return container. Once the immobilization equipment has been returned (826), the system can refund any deposit placed on the equipment by the debtor.

Figure 9:
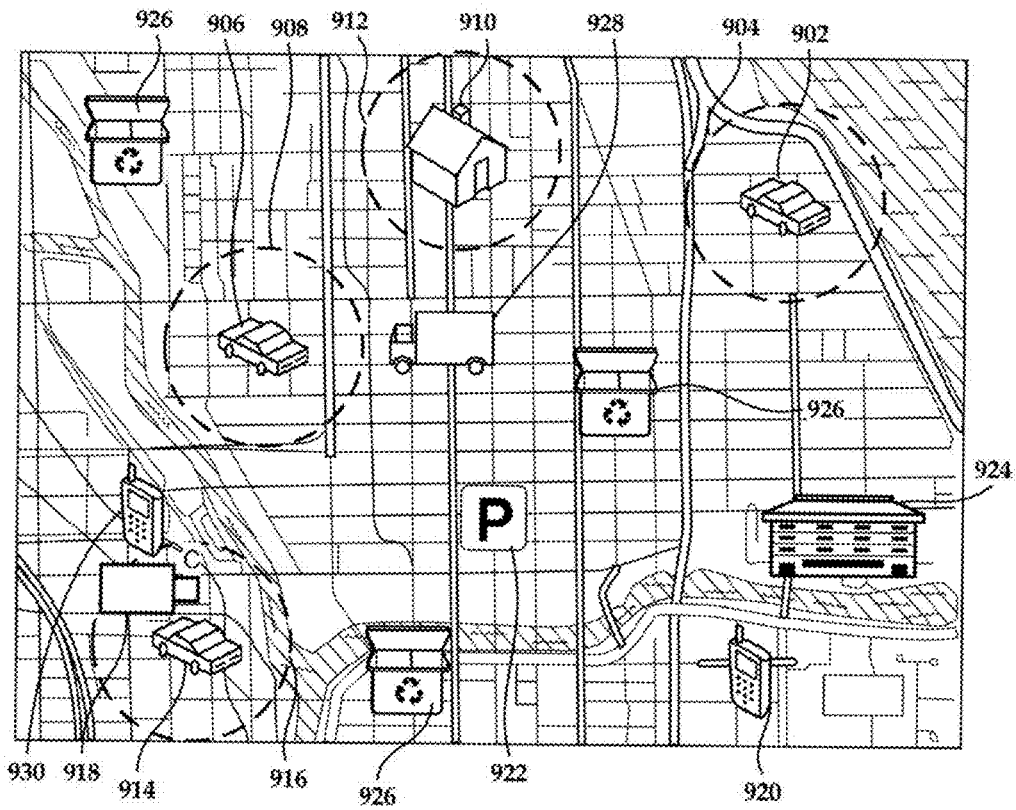
FIG. 9 is a geographical diagram of an exemplary environment for violation enforcement utilizing vehicle immobilization according to one embodiment.

Referring now to FIG. 9, a geographical diagram of an exemplary environment for violation enforcement utilizing vehicle immobilization according to one embodiment is illustrated. According to one embodiment, the system may generate and transmit notifications to recovery vehicles and agent devices when they are located within proximity to a location of interest, such as the location of a vehicle of interest 902, 906, 914 or of an address of interest 910. The address of interest may be an address associated with a vehicle of interest, such as the address of the vehicle owner or location where the vehicle has been frequently spotted by ALPR devices. Each of the locations of interest 902, 906, 910, 914 has proximity boundaries 904, 908, 912, 916 associated with the locations, respectively. The proximity boundaries may be predefined boundaries that are used by the system to monitory when a client device is near a location of interest.

As described in connection with FIG. 8, ALPR device 918 may be mounted on an agent vehicle and scanning license plates. A memory component of the ALPR device may store the vehicle hotlist as well as software for processing LPR data, including running image recognition and OCR. A processor associated with the ALPR device may compare the recognition results to the hotlist details to generate an alert when a vehicle of interest is identified. Alternatively or in addition, the ALPR device may contain a further wireless telecommunications component that communicates with the server to transmit the LPR data to the server. In this case, the recognition system located at the server may process the LPR data and return the results to the ALPR device asynchronously or in real-time.

When ALPR device 918 captures and process an image of the license plate of vehicle of interest 914, the ALPR device or system server will generate an alert. If the alert is generated by the server, the alert may be sent directly to ALPR device 918 or may be sent to a nearby client device, such as one of agent devices 920, 930. Agent devices 920, 930 may be part the ALPR devices themselves, such as a component of ALPR device 918, or may be another GPS enabled device or telecommunication device. The system may consider the proximity boundary 916 of vehicle of interest 914 to determine which agent device to transmit the notification or alert to. In this instance, agent device 930 will be determined to be in closer proximity to vehicle of interest 914 and may receive the alert. In some embodiments, the system may prompt agent device 930 to confirm whether the agent is available for recovery. If the agent device 930 is unavailable, the system will attempt to notify an alternative recovery method, such as agent device 920 or recovery vehicle 928. Recovery vehicle 928 may be a tow truck or similar vehicle having a contractual relationship with either the system administrator or with a creditor institution.

In some embodiments, the system may store the locations of the vehicle of interest 902, 906, 914 when the ALPR systems capture the LPR data and transmit the geo-location data to the system servers. In this case, the system can monitor when agent devices 920, 930 or recovery vehicle 928 are within a given proximity boundary 904, 908, 916 to vehicles of interest 902, 906, 914, respectively, and generate an alert notifying the agent devices 920, 930 or recovery vehicle 928 that a vehicle to be immobilized is nearby. Additionally, the system may retrieve any addresses associated with the vehicle registration information from a third-party database or process the historical LPR data to determine a location where a vehicle has been frequently spotted. The system may store these addresses to one or more databases as locations of interest, such as location of interest 910. In this way, the system can generate and transmit a similar alert to agent devices 920, 930 or recovery vehicle 928 when they are within proximity boundary 912 to the location of interest. The agents associated with agent devices 920, 930 or recovery vehicle 928 may then navigate to location of interest 910 to determine whether a vehicle of interest is present such that it can be immobilized. Once a vehicle of interest 902, 906, 914 is located, an agent can proceed to the vehicle and the immobilization process can proceed as described in connection with FIG. 8.

After the vehicle of interest has been immobilized, the borrower will be able to contact the creditor or system administrator to make a payment to bring the loan current or pay any outstanding parking violations. For example, the borrower may contact call center 924 to process a payment over the telephone or from a computing device. Once payment has been made, the immobilization device will be deactivated and the borrower can return the device to receive a refund of any deposit. The borrower can return the device to any of return containers 926, to call center 924, or to storage garage 922, as may be available according to the terms of agreement. In some embodiments, information for the nearest return container 926, call center 924, or storage garage 922 may be provided on the notice attached to the vehicle when the agent immobilizes the vehicle.

Figure 10:
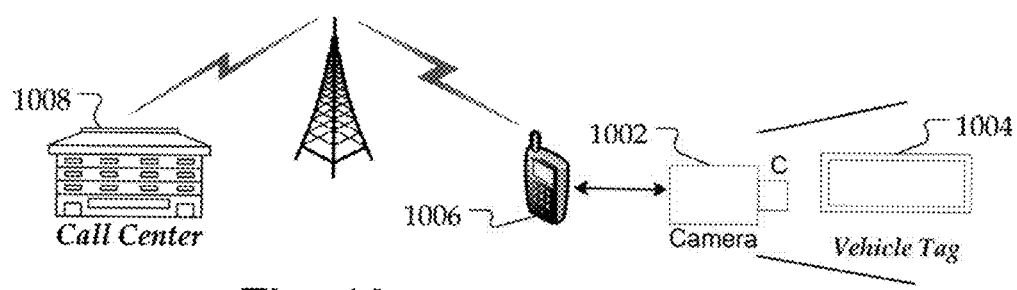
FIG. 10 is a schematic diagram of an exemplary system for conducting automatic violation detection according to one embodiment.

Referring now to FIG. 10, a schematic diagram of an exemplary system for conducting automatic violation detection is illustrated according to one embodiment. As described in connection with FIGS. 8 and 9, ALPR device may contain camera 1002 for scanning vehicle tags 1004. Camera 1002 may be a component of any ALPR device, such as municipal cameras 410, highway toll-collection cameras 412, traffic cameras 416, security cameras 418, spotter vehicle cameras 420, law enforcement cameras 422, "crowd-source" external devices 424, and other video image capture devices 424, described in connection FIG. 4. Camera 1002 may continuously capture images of vehicles and their vehicle tags 1004 as the spotter vehicles (or the vehicles of interest) drive along streets, travel through parking lots, and along other access routes. Camera 1002 may be associated with a telecommunication device 1006, which may be same devices as client devices 722, and transmit the captured LPR data to the system servers to be processed, such as by video and image input processor 312 of the database controller 110 and the video/image feed system 330. The captured LPR data may be communicated to the system servers and notification alerts sent to call center 1008, which may be maintained by the system administrator or by a third-party contractor having a contractual relationship with the system administrator to receive updates regarding identified vehicles of interest.

Figure 11:
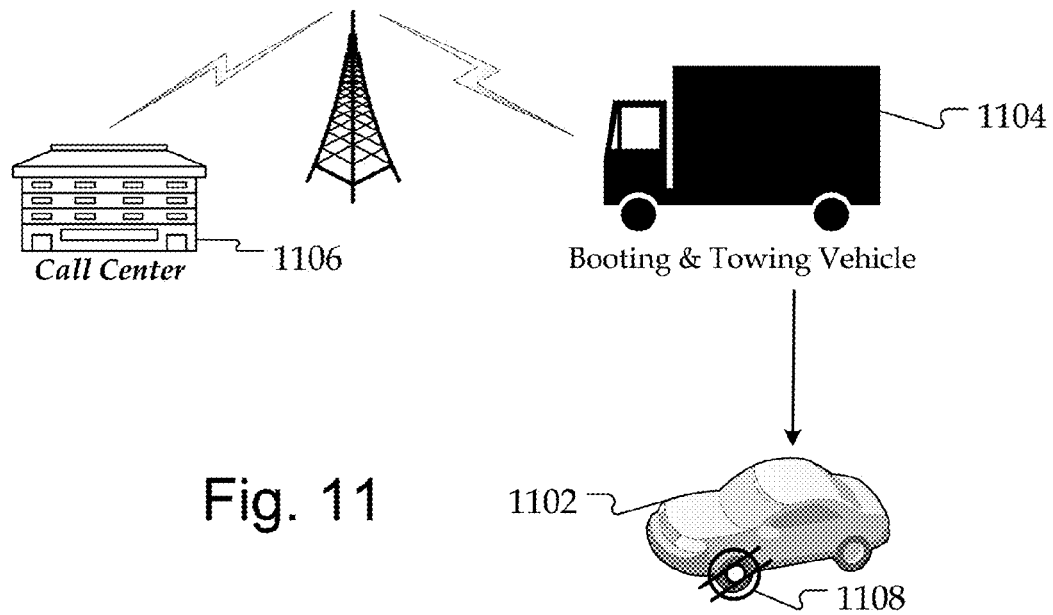
FIG. 11 is a schematic diagram of an exemplary system for notifying a mobile recovery vehicle of an asset location according to one embodiment.

Referring now to FIG. 11, a schematic diagram of an exemplary system for notifying a mobile recovery vehicle of an asset location is illustrated according to one embodiment. As described further in connection with FIGS. 8 and 9, the system may generate and transmit notifications to recovery vehicles and agent devices when they are located within proximity to a location of interest, such as the location of a vehicle of interest or of an address of interest. The agents may operate booting and towing vehicles 1104. When the system identifies a vehicle or location of interest, a call center 1106 associated with the system may transmit directions to the vehicle of interest 1102 to the operator of booting and towing vehicle 1104. Booting and towing vehicle 1104 may then navigate to vehicle of interest 1102 and place immobilization device 1108 on vehicle of interest 1102. The process for returning deactivating the immobilization device 1108 may then proceed as further described in connection with FIGS. 8 and 9.

Figure 12:
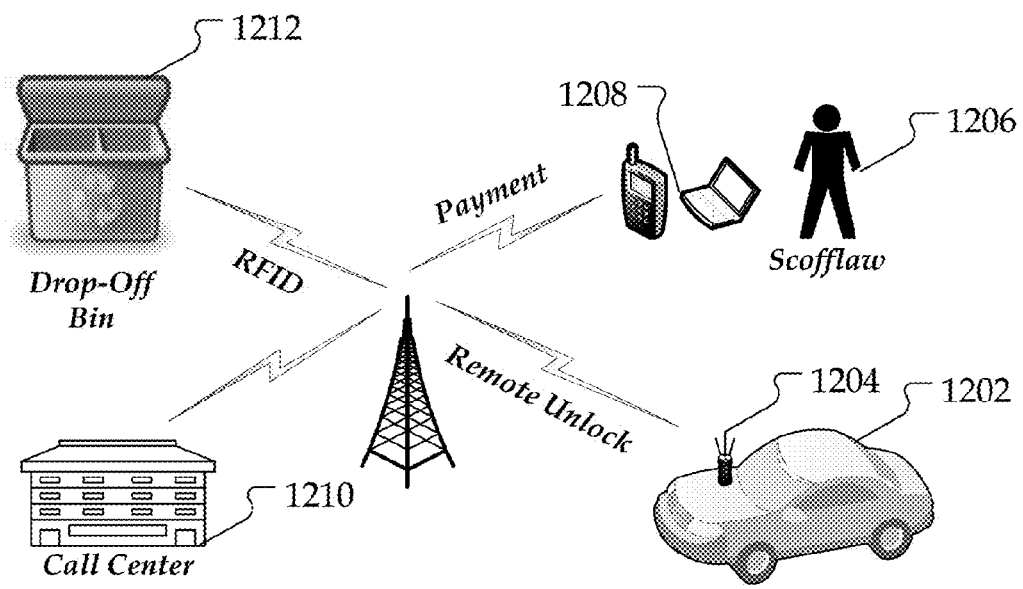
FIG. 12 is a schematic diagram of an exemplary system for reinstating mobilization of a disabled vehicle according to one embodiment.

Referring now to FIG. 12, a schematic diagram of an exemplary system for reinstating mobilization of a disabled vehicle is illustrated according to one embodiment. In the depicted embodiment, a transponder immobilization device 1204 has been placed on vehicle of interest 1202. In some embodiments, transponder immobilization device 1204 may also be a booting device having similar telematics capabilities. As discussed in connection with FIG. 8, transponder immobilization device 1204 may include may include an immobilization controller that may be coupled to a telematics control unit. The telematics control unit may include a telematics controller that is preferably microprocessor based. The telematics controller may be coupled to a transmitter and a receiver. The transmitter and receiver may receive communications from a telecommunications network through an antenna. A suitable antenna may be used for the type of communications received. For example, antenna may be configured to receive satellite signals, wireless cellular signals or the like. In one embodiment, the system may utilize immobilization devices having low-frequency RF generator components in addition to telecommunication capabilities When scofflaw or debtor 1206 returns to the vehicle of interest 1202, they are presented with terms of agreement for reinstating mobilization of the disabled vehicle. For example, the terms of agreement may contain payment information, as well as any additional the terms that the creditor or system may require to use the remote activation functionality of the system. The terms of agreement may require that scofflaw or debtor 1206 return immobilization device 1204 to drop-off bin 1212, as described further in connection with FIGS. 8 and 9. The terms of agreement may also contain any notices required by state, federal, or local regulations. If scofflaw or debtor 1206 agrees to the terms of agreement, scofflaw or debtor 1206 may utilize a mobile telecommunication device or computing device 1208 to contact the creditor. For example, scofflaw or debtor 1206 may use a mobile telephone to contact call center 1210, or may use a computing device to access an interface provided by call center 1210 to initiate a payment of the balance required to bring any loan obligation current or pay any outstanding parking violation. Once the scofflaw or debtor 1206 has made the necessary payment, the system may remotely transmit a signal to immobilization device 1204 to reinstate mobility of vehicle of interest 1202. In some embodiments, the system may transmit a code that can be entered on a keypad of the immobilization device to reinstate mobility. Once reinstated, the scofflaw or debtor 1206 may be required to return the immobilization device to drop-off bin 1212. As described in connection with FIGS. 8 and 9, immobilization device may have a low-frequency RF detector that is able to detect that immobilization device 1204 has been placed in drop-off bin 1212. When immobilization device 1212 is recognized as being returned, drop-off bin 1212 may transmit a signal to call center 1210 notifying the system that immobilization device 1204 has been returned. For example, the signal may contain unique RF identification number associated with immobilization device 1204. The system then processes the signal to initiate a repayment of any deposit placed on immobilization device 1204 to scofflaw or debtor 1206.

A number of applications of identifying vehicles of interest and locations of interest have been identified in connection with the present disclosure. It will be apparent to those of ordinary skill in the art that the described applications are merely exemplary, and that many more embodiments and implementations are envisioned within the spirit and scope of the present disclosure. The system is adaptable and scalable and may utilize historical LPR data to generate proximity alerts for locations of interest and vehicles of for nearly any application. For example, the system may generate alerts to be transmitted to any company that has an interest in immobilizing a vehicle, such as repossession companies, vehicle recovery and salvage companies, creditor institutions, parking enforcement agencies, municipalities, law enforcement, and the like.

Additionally, parking management services and municipalities may utilize RF chips located inside of vehicle stickers and parking permits to transmit signals related to authorized parking locations. In this instance, the ALPR devices of the system can be modified to receive the RF signals generated by the vehicles in order to identify vehicles that are likewise subject to immobilization. The ALPR devices may receive the RF signal and process the signal to detect when a vehicle is authorized to be parked in a certain geographic location. The system may communicate with one or more public or municipality databases to retrieve authorization information. Once a vehicle is detected that is unauthorized, a proximity alert or notification can be generated and sent to the agent or recovery vehicle and the remainder of the process can proceed as described in connection with FIGS. 8 and 9.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for violation enforcement utilizing vehicle immobilization, the method comprising:
   providing a database having stored therein identifying information corresponding to a plurality of target vehicles subject to immobilization and repossession, each target vehicle of the plurality of target vehicles associated with a specific authorizing creditor company of a plurality of creditor companies;
   receiving, from a license plate recognition system, a notification containing identifying information for a plurality of vehicles and geographic locations for the plurality of vehicles;
   comparing, by an output processor, the identifying information in the notification against identification information for the plurality of target vehicles stored in the database to determine a match;
   determining whether remote on-board immobilization is available for at least one target vehicle of the plurality of target vehicles subject to immobilization;
   upon determination of the match and determination that remote on-board immobilization is available for the at least one target vehicle of the plurality of target vehicles subject to immobilization, then generating and outputting, by the output processor, an immobilization signal containing the identifying information for at least one target vehicle of the plurality of target vehicles subject to immobilization;
   receiving, by a telecommunication device coupled to an on-board computer system of the at least one target vehicle, the immobilization signal outputted by the output processor;
   upon receipt of the immobilization signal by the telecommunication device of the on-board computer system, immobilizing the at least one target vehicle when a determination is made that the at least one target vehicle is parked; and
   notifying a repossession agency associated with the specific authorizing creditor company corresponding to the immobilized target vehicle, to take action with respect to the immobilized target vehicle.

2. The method of claim 1, wherein the telecommunication device of the on-board computer system is further configured to receive a signal over the telecommunications network to reinstate mobilization of the at least one target vehicle of the plurality of target vehicles, corresponding to the at least one target vehicle that has previously received the immobilization signal and is currently parked.

3. The method of claim 1, wherein after the repossession agency has been notified and taken action, then providing a printed notice containing information required to deactivate the immobilization.

4. The method of claim 1, wherein the database is logically segmented so that records corresponding to a specific target vehicle of the plurality of target vehicles are available only to a corresponding authorizing creditor company, and the records not available to other authorizing credit companies.

5. The method of claim 1, wherein records of the database are tagged so that records corresponding to a specific target vehicle of the plurality of target vehicles are available only to a corresponding authorizing creditor company, and the records not available to other authorizing credit companies.

* * * * *